US008253057B1

(12) United States Patent
Hunt

(10) Patent No.: US 8,253,057 B1
(45) Date of Patent: Aug. 28, 2012

(54) SYSTEM AND METHOD FOR PLASMA GENERATION

(76) Inventor: Jack Hunt, Covert, MI (US)

(*) Notice: Subject to any disclaimer, the term of this patent is extended or adjusted under 35 U.S.C. 154(b) by 9 days.

(21) Appl. No.: 11/330,297

(22) Filed: Jan. 11, 2006

Related U.S. Application Data

(63) Continuation-in-part of application No. 10/934,154, filed on Sep. 3, 2004, now abandoned.

(51) Int. Cl.
*B23K 10/00* (2006.01)
*H05H 1/24* (2006.01)

(52) U.S. Cl. .............................. 219/121.36; 315/111.21

(58) Field of Classification Search ............. 219/121.36, 219/121.48, 121.52; 315/111.21, 111.51, 315/111.71; 118/723 E, 723 R, 723 FI
See application file for complete search history.

(56) References Cited

U.S. PATENT DOCUMENTS 4,947,085 A 8/1990 Nakanishi et al.
4,987,345 A * 1/1991 Stormberg et al. ...... 315/111.21
5,030,885 A 7/1991 Holmes
5,173,641 A 12/1992 Imahashi et al.
5,335,238 A 8/1994 Bahns
5,449,977 A 9/1995 Nakagawa et al.
5,565,249 A * 10/1996 Kurihara et al. .............. 427/577
5,896,012 A 4/1999 Munemasa et al.
6,095,084 A 8/2000 Shamouilian et al.
6,113,731 A 9/2000 Shan et al.
6,627,859 B1 9/2003 Kasai et al.
6,696,792 B1 2/2004 Foster
6,894,245 B2 5/2005 Hoffman et al.
7,026,763 B2 * 4/2006 Rostoker et al. ......... 315/111.21
2003/0160724 A1 8/2003 Alexeff et al.
2003/0230241 A1 12/2003 Rostoker et al.
2003/0234617 A1 12/2003 Monkhorst et al.
2005/0194910 A1 9/2005 Vukovic et al.

FOREIGN PATENT DOCUMENTS

EP 0 223 975 A2 6/1987

OTHER PUBLICATIONS

Self-Organized Plasmas, Briefing for the SEAB Task Force on Fusion Energy, Princeton Plasma Physics Laboratory, Apr. 30, 1999, Richard E. Siemon, Fusion Energy Program Manager, Los Alamos National Laboratory, LA-UR-99-2070.
Research, Applied Plasma Technology Laboratory, Old Dominion University Center for Bioelectrics, Dec. 2002, www.ece.odu.edu/~mlarouss/research.htm.
Trek-Like 'Cold Plasmas' Shield, Cloak, James Schultz, Jul. 2000, www.space.com/businesstechnology/technology/cold plasma 000724.html.

(Continued)

*Primary Examiner* — Quang T Van

(57) ABSTRACT

A system and method for generating a plasma. An embodiment of the system for generating a plasma may include a first electrode; a second electrode disposed adjacent the first electrode; a first power supply for supplying power at the second electrode; a second power supply for generating a magnetic field; and a sequencer for coordinating a discharge of power from the first power supply and a discharge of power from the second power supply. The first power supply may be configured such that the discharge of power from the first power supply generates a plasma between the first electrode and the second electrode. The second power supply may be configured such that the magnetic field generated by the discharge of power from the second power supply rotates the plasma.

43 Claims, 16 Drawing Sheets

OTHER PUBLICATIONS

Hot Prospects for Cold Plasma, Olga Kharif, BusinessWeek Online, Jan. 2001, www.businessweek.com/bwdaily/dnflash/jan2001/nf2001018 024htm.

Markland Technologies Announces Update on Use of Plasma for Biological Decontamination, news release, Apr. 2003, www.pressbox.co.uk/Detailed/6855.html.

ASI Technology Corporation Receives U.S. Government Grant to Study Plasma for Biological Decontamination, ASI Press Release, Aug. 2002, www.asiplasma.com.

Plasmoid (Ball Lightning) Generation with Microwaves, Jean-Louis Naudin, Feb. 2004, www.jlnlabs.online.fr/plasma/gmrtst/.

"The Interaction of a Flowing Plasma With a Dipole Magnetic Field: Measurements and Modelling of a Diamagnetic Cavity Relevant to Spacecraft Protection", R Bamford et al., Plasma Physics and Controlled Fusion, published Nov. 4, 2008, pp. 1-11.

* cited by examiner

SYSTEM AND METHOD FOR PLASMA GENERATION

CROSS REFERENCE TO RELATED APPLICATIONS

This application is a continuation-in-part of U.S. Ser. No. 10/934,154, filed Sep. 3, 2004 now abandoned.

FIELD OF THE INVENTION

Embodiments of the present invention relate to the field of plasma generation and, in particular, to the generation of plasma contained within a boundary without a container.

DESCRIPTION OF RELATED ART

Plasmas have long been the subject of research and investigation and continue to be the focus of many academic and industrial studies. However, while plasma is understood to be the most common form of matter in the universe, its use as a technology with widespread industrial applicability has been limited.

The use of plasmas in industry has traditionally been limited by various practical considerations. Plasmas are generally accompanied by thermal pressure gradients. Because many plasmas operate with high energy, the air comprising the plasma becomes hot and expands. Thus, any increase in plasma energy is typically accompanied by an increase in plasma volume. Plasmas with energies that have been useful in industry typically have had volumes so large that they are cumbersome.

In addition, plasmas typically generate strong electromagnetic and RF interference, making plasma-based devices largely incompatible with other electronic devices. Without the ability to control the interference generated by a plasma-based device, the operation of many electronic devices in the vicinity of the plasma-based device becomes needlessly compromised.

Plasmas have also typically required great amounts of power for their operation. Because of the high energies typically associated with plasma use, large power supplies have traditionally been required to operate plasmas, making plasmas unavailable in portable or mobile applications and available only for applications with the resources to generate the requisite power.

Also, plasmas developed for industrial use have typically not generated enough physical force to be effective in stopping a projectile. Because most industrially developed plasmas have random force vectors associated with them, the use of plasmas as physical shields have been unavailable.

SUMMARY OF THE INVENTION

According to an embodiment of the present invention, a system for generating a plasma may include a first electrode; a second electrode disposed adjacent the first electrode; a first power supply for supplying power at the second electrode; a second power supply for generating a magnetic field; and a sequencer for coordinating a discharge of power from the first power supply and a discharge of power from the second power supply. The first power supply may be configured such that the discharge of power from the first power supply generates a plasma between the first electrode and the second electrode. The second power supply may be configured such that the magnetic field generated by the discharge of power from the second power supply rotates the plasma.

The sequencer may trigger the first power supply and the second power supply such that a peak output of the first power supply occurs at substantially the same time as a peak output of the second power supply. Also, the sequencer may trigger the first power supply and the second power supply such that a peak output of the first power supply occurs within approximately one millisecond of a peak output of the second power supply.

The system may further include an impedance circuit disposed between the first power supply and the second electrode. The impedance circuit may match an impedance of the first power supply to an impedance of the second electrode and a gap between the first electrode and the second electrode.

The first power supply may include a third power supply and a fourth power supply. The third power supply may supply a voltage and the fourth power supply may supply a current.

The second electrode may be disposed within a boundary of the first electrode. The first electrode may be configured as a loop or ring. The first power supply may be connected to a first side of the impedance circuit and the second electrode may be connected to a second side of the impedance circuit.

The system may further include a ring magnet and windings surrounding the ring magnet. The second power supply may discharge power into the windings. The system may further include a detection device for detecting an object in a vicinity of the first electrode. The detection device may trigger the sequencer and may initiate a modulation of the first power supply.

According to an embodiment of the present invention, a method for generating a plasma may include providing a first electrode; providing a second electrode disposed adjacent the first electrode; supplying power to the second electrode with a first power supply; generating a magnetic field with a second power supply; and coordinating a discharge of power from the first power supply and a discharge of power from the second power supply. The discharge of power from the first power supply may generate a plasma between the first electrode and the second electrode. The magnetic field resulting from the discharge of power from the second power supply may rotate the plasma.

The step of coordinating may include causing a peak output of the first power supply to occur at substantially the same time as a peak output of the second power supply. The step of coordinating may include causing the peak output of the first power supply to occur within approximately one millisecond of the peak output of the second power supply.

The method may further include disposing an impedance circuit between the first power supply and the second electrode. The impedance circuit may match an impedance of the first power supply to an impedance of the second electrode and a gap between the first electrode and the second electrode.

Providing a second electrode may include disposing the second electrode within a boundary of the first electrode. The first electrode may be configured as a loop.

With the foregoing invention, a free-standing protective plasma field may be generated between the first and second electrodes to thereby protect an interior space or zone within the plasma field. This plasma field and the shape and physical characteristics thereof may be varied and specifically designed by varying the physical structure of first and second electrodes as well as the structure of the magnet unit and the electromagnetic field generated thereby.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
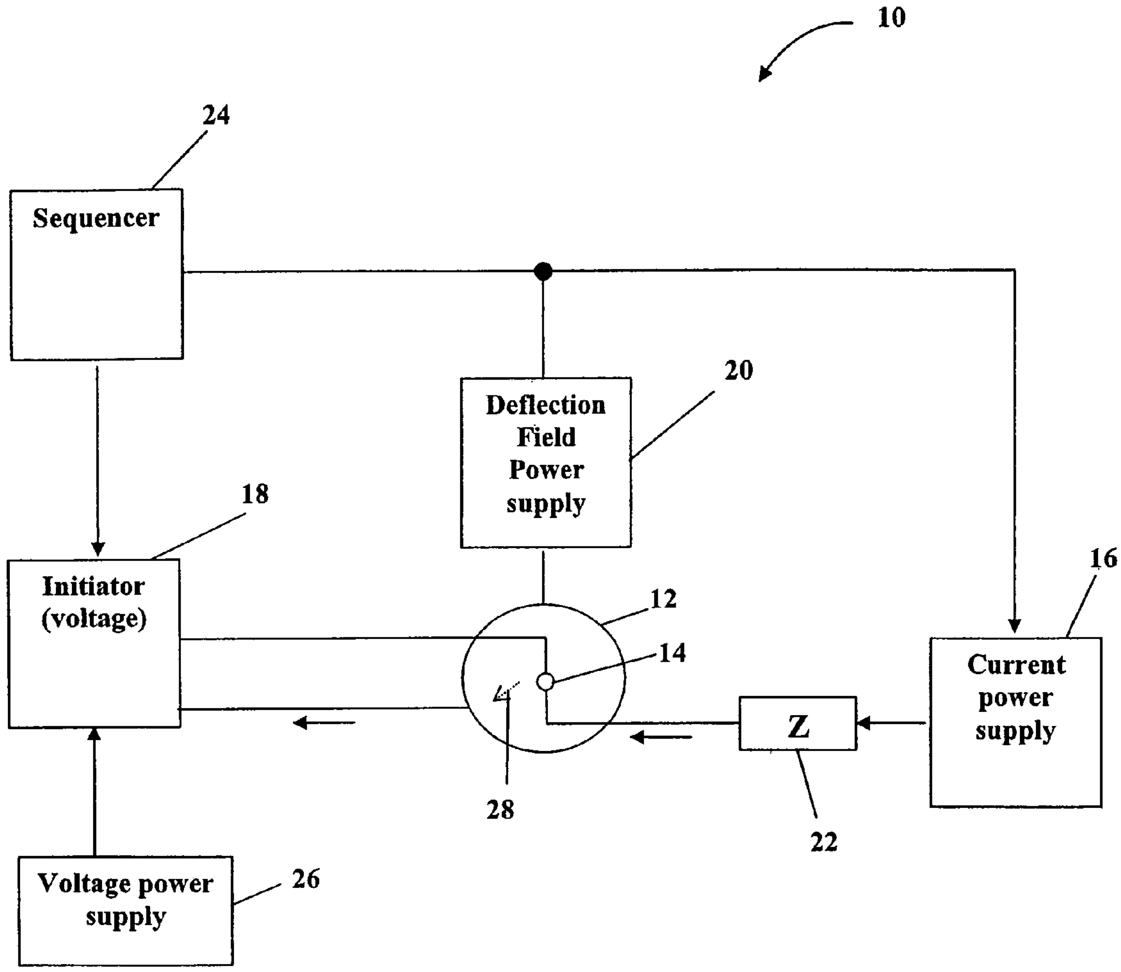
FIG. 1 shows a system for plasma generation according to an embodiment of the present invention.

FIG. 1 shows a system for plasma generation 10 according to an embodiment of the present invention. The system 10 shown in FIG. 1 includes, but is not limited to, a first electrode 12, a second electrode 14, a deflection field power supply 20, a current power supply 16, an initiator supply 18 and a sequencer 24. The system 10 of FIG. 1 may also include a voltage power supply 26 and an impedance matching network 22.

In the embodiment of the invention shown in FIG. 1, the first electrode 12 and the second electrode 14 may be configured in a variety of ways. For example, the first electrode 12 maybe a positive electrode in the form of a loop or annular ring while the second electrode 14 may be a negative electrode disposed in the center of the first electrode 12. However, the first electrode 12 and the second electrode 14 may be placed in any configuration that facilitates a discharge of power and the forming of a plasma between the first electrode and the second electrode.

The first electrode 12 and the second electrode 14 may be fabricated from a variety of materials. For example, according to an embodiment of the present invention, the first electrode 12 may be made from copper while the second electrode 14 may be made from tungsten. However, the first electrode 12 and the second electrode 14 may be fabricated from any electrically conductive material.

One or more power supplies may be connected to the electrodes. For example, in the system 10 shown in FIG. 1, a current power supply 16 and an initiator supply 18 are connected to the second electrode 14. Although the embodiment of the invention shown in FIG. 1 includes two power supplies, i.e., the current power supply 16 and the initiator supply 18, to provide power at the second electrode 14, embodiments of the invention may use one or more power supplies to provide power to the second electrode 14. For example, a single power supply may be used to provide voltage and current to the second electrode 14. In alternative embodiments, one power supply may be used to provide voltage to the second electrode 14 while a plurality of power supplies may be used to provide current to a second electrode 14. In other alternative embodiments, a plurality of power supplies may be used to provide a voltage to the second electrode 14 while a single power supply may be used to supply current to the second electrode 14.

The current power supply 16 and the initiator supply 18 may be chosen to provide sufficient power to cause a discharge of power and formation of a plasma between the second electrode 14 and the first electrode 12. For example, the current power supply 16 and the initiator supply 18 may be chosen such that current travels from the second electrode 14 to the first electrode 12, generating a plasma 28 (represented in FIG. 1 by an arrow showing the direction of plasma current flow) in the space between the second electrode 14 and the first electrode 12. The power supply or supplies used to provide power to the second electrode 14 and generate the plasma 28 may be any of a variety of power supply types. For example, the power supply or power supplies may be an AC supply, a DC supply, a pulsed DC supply, a linear supply, a switching supply or the like.

According to an embodiment of the present invention, the current power supply 16 maybe a 450 volt DC power supply capable of sourcing 30 amps. The initiator supply 18 may be a 45 kilovolt DC power supply. The initiator supply 18 may be configured as a Marx bank or other type of network capable of generating a high voltage. The initiator supply 18 may also be configured to source sufficient current, such as 30 amps, for example.

The deflection field power supply 20 may be used to supply power for generating a magnetic field that rotates the plasma 28 about the circumference of the first electrode 12. The deflection field power supply 20 may be an AC supply, a DC supply, a pulsed DC supply, a linear supply, a switching supply or the like. According to an embodiment of the present invention, the deflection field power supply 20 may be a 900 volt DC power supply capable of sourcing 1 amp.

Figure 2A:
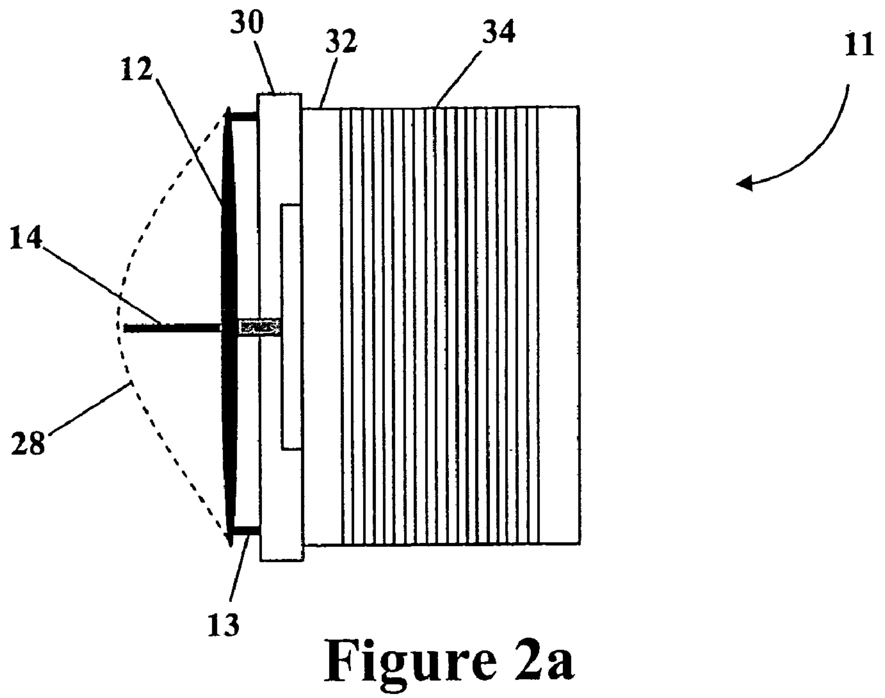
FIG. 2*a* shows a side view of an electromagnetic field generator according to an embodiment of the present invention.

The deflection field power supply 20 may supply power to a variety of electrical configurations to generate a magnetic field. For example, FIG. 2*a* shows a side view of an electromagnetic field (EMF) generator 11 that may be powered by the deflection field power supply 20 according to an embodiment of the present invention. In FIG. 2*a*, an electromagnet core 32, which may be a solid core, for example, is wound with windings 34 which may be connected to the deflection field power supply 20. When the windings 34 are energized by the deflection field power supply 20, a magnetic field is produced that generates a force which acts on the plasma 28 existing between the first electrode 12 and the second electrode 14. An insulator 30, such as a mica insulator, for example, may be disposed between the electromagnet core 32 and the first electrode 12 and the second electrode 14. The first electrode 12 may be attached to the insulator 30 using one or more connectors 13. According to an embodiment of the present invention, the first electrode 12 is attached to the insulator 30 with four, evenly spaced connectors 13 that facilitate balancing the inductance of the first electrode 12.

Figure 2B:
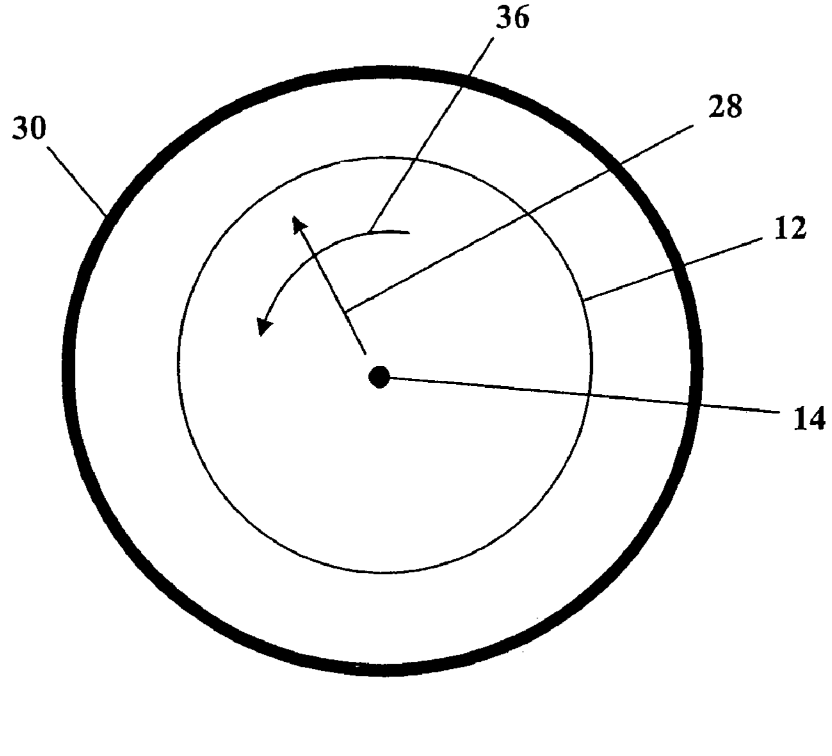
FIG. 2*b* shows a force diagram according to an embodiment of the present invention.

FIG. 2*b* shows a force diagram associated with the first electrode 12 and the second electrode 14 when a plasma is simultaneously generated with a magnetic field. In FIG. 2*b*, the plasma 28 has been induced in the air gap between the first electrode 12 and the second electrode 14 by appropriately powering the current power supply 16 and the initiator supply 18, as will be explained in greater detail below. The first electrode 12 and the second electrode 14 are shielded from the electromagnet formed by core 32 and windings 34 by the insulator 30. Energizing the electromagnet 32 and 34 causes a Lorentz force 36 (represented in FIG. 2*b* by an arrow showing the direction of plasma movement) to act upon the plasma 28. Thus, the plasma 28 will rotate in the direction of the force 36 much in the same way a rotor in an electromagnetic motor rotates due to the force generated by the electromagnet in the motor. However, in the embodiment of the invention shown in FIG. 2*b*, the plasma, i.e., "the charged air," acts as the rotor. As can be seen in FIG. 2*a*, the plasma 28 forms a "dome" over the electromagnetic field generator 11.

Figure 3A:
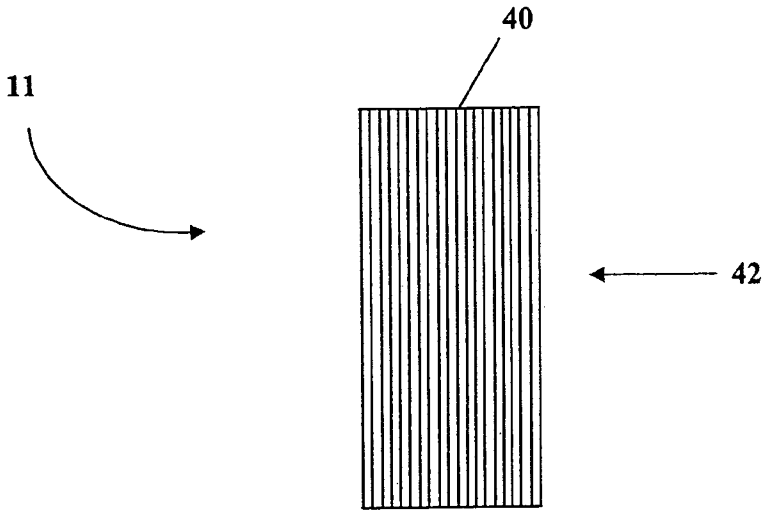
FIG. 3*a* shows a side view of an electromagnetic field generator according to another embodiment of the present invention.

FIG. 3*a* shows a side view of an electromagnetic field generator 11 that may be powered by the deflection field power supply 20 according to another embodiment of the present invention. In FIG. 3*a*, a ring magnet 42 is wound with windings 40 which may be connected to the deflection field power supply 20. The ring magnet 42 may be any of a variety of magnet types and may be configured as a simple dipole magnet.

When the windings 40 are energized by the deflection field power supply 20, a magnetic field is produced that produces a force which acts on the plasma 28 existing between the first electrode 12 and the second electrode 14. In the embodiment of the invention shown in FIG. 3*a*, the first electrode 12 and the second electrode 14 may be disposed within the interior of the ring magnet 42.

Figure 3B:
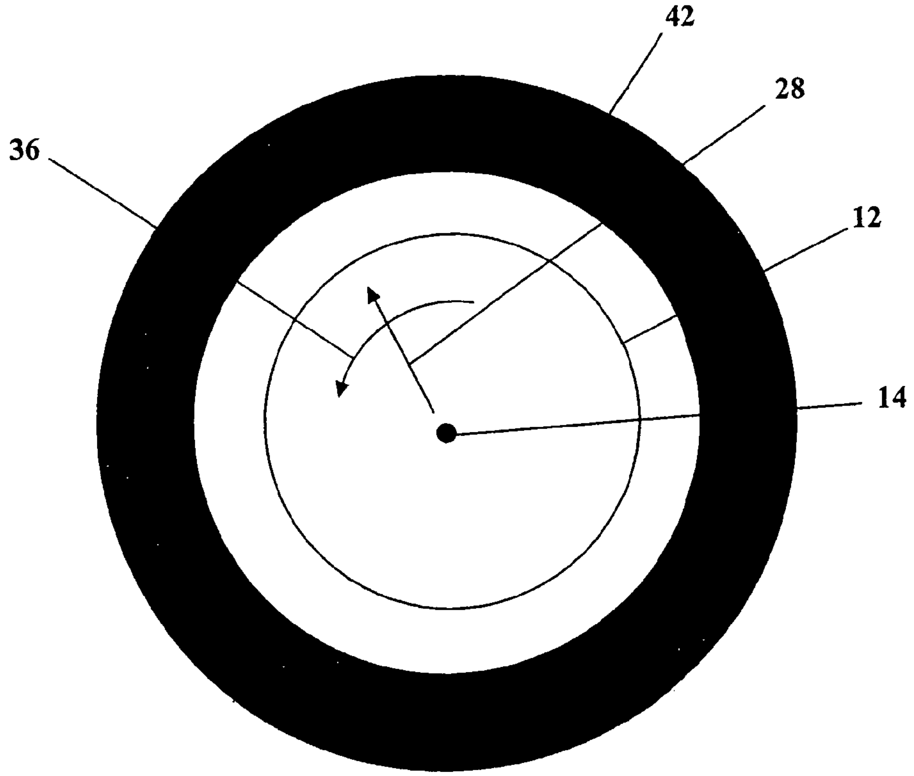
FIG. 3*b* shows a force diagram according to another embodiment of the present invention.

FIG. 3*b* shows a force diagram associated with the first electrode 12 and the second electrode 14 when a plasma is simultaneously generated with a magnetic field. In FIG. 3*b*, the plasma 28 has been induced in the air between the first electrode 12 and the second electrode 14 by appropriately powering the current power supply 16 and the initiator supply 18, as will be explained in greater detail below. Energizing the windings 40 of the ring magnet 42 causes a Lorentz force 36 to act upon the plasma 28. Due to the high current levels in the plasma 28, the plasma may be accelerated rapidly, resulting in a "sheet" of plasma. Also, due to the effects of angular momentum and inertial confinement, rotating charged particles may be locked in an orbital path around the second electrode 14. The velocity of the particles, coupled with magnetic pressure gradients and magnetic, or reverse-field, "pinch" effects, associated with the magnetic field generated by the deflection field power supply 20 act to form a plasma boundary which prevents charged particles from escaping the boundary of the plasma.

In operation, a flux generated by the ring magnet 42 may be aligned with the current discharge of the current power supply 16 while a magnetic field rise and fall time generated by the ring magnet 42 may be synchronized with the same current discharge of the current power supply 16 so that saturation of the core of the ring magnet 42 coincides with population inversion of the plasma 28. During population inversion of the plasma 28, typically over one-half of the atoms in the gas existing between the first electrode 12 and the second electrode 14 may be charged or ionized. Because ionized particles will interact with the magnetic field generated by the deflection field power supply 20 and the ring magnet 42, it is desirable that as many atoms as possible in the gas existing between the first electrode 12 and the second electrode 14 become charged.

Also, the charged or ionized atoms exhibit a "metastable" lifetime, i.e., a time during which a charged atom will retain its charge before losing its charge by emitting a photon or other means. Accordingly, in order to maximize charging of the atoms in the gas between the first electrode 12 and the second electrode 14, it may be desirable that as many atoms as possible in the gas between the first electrode 12 and the second electrode 14 become charged or ionized (population inversion) before the metastable lifetime is reached by the first atoms to become charged. To achieve this result, energy sufficient to cause population inversion may be imparted to the plasma 28 in a relatively short period of time. For example, according to an embodiment of the present invention, energy may be imparted to the plasma 28 from the various power supplies in about 1 millisecond. Doing so may permit maximum deflection of the plasma 28 by the magnetic field generated by the deflection field power supply 20 and the ring magnet 42 and allow for maximum acceleration of the charged particles making up the plasma 28. Upon achieving critical acceleration, charged particles pass an inertial confinement threshold at the moment of maximum magnetic pinch, confining the plasma in all axes simultaneously, producing a flat circular plasma sheet with a force vector concentrated in a radial direction.

Returning back to FIG. 1, the sequencer 24 may be used to coordinate the timing of the current power supply 16, the initiator supply 18 and the deflection field power supply 20 so that ionic saturation of the plasma 28 coincides with magnetic field saturation and flux alignment. For example, the sequencer 24 may be used to provide timing signals to each of the power supplies in the system 10 so that the plasma 28 is effectively induced between the first electrode 12 and the second electrode 14 and is caused to rotate about the circumference of the first electrode 12 in response to the magnetic field generated by the deflection field power supply 20 and the ring magnet 42. The sequencer 24 may include discrete devices or may include a microcontroller, microprocessor and the like or may include a combination of discrete devices and microcontrollers to generate the timing signals that coordinate the discharge of power from the current power supply 16, the initiator supply 18 and the deflection field power supply 20. For example, according to an embodiment of the present invention, the sequencer 24 may include a plurality of monostable multivibrators (i.e., one-shots) configured in a manner to appropriately sequence the discharge of power from the current power supply 16, the initiator supply 18 and the deflection field power supply 20. According to another embodiment of the present invention, the sequencer 24 may include a self-contained microcontroller programmed to appropriately sequence the discharge of power from the current power supply 16, the initiator supply 18 and the deflection field power supply 20.

Figure 4A:
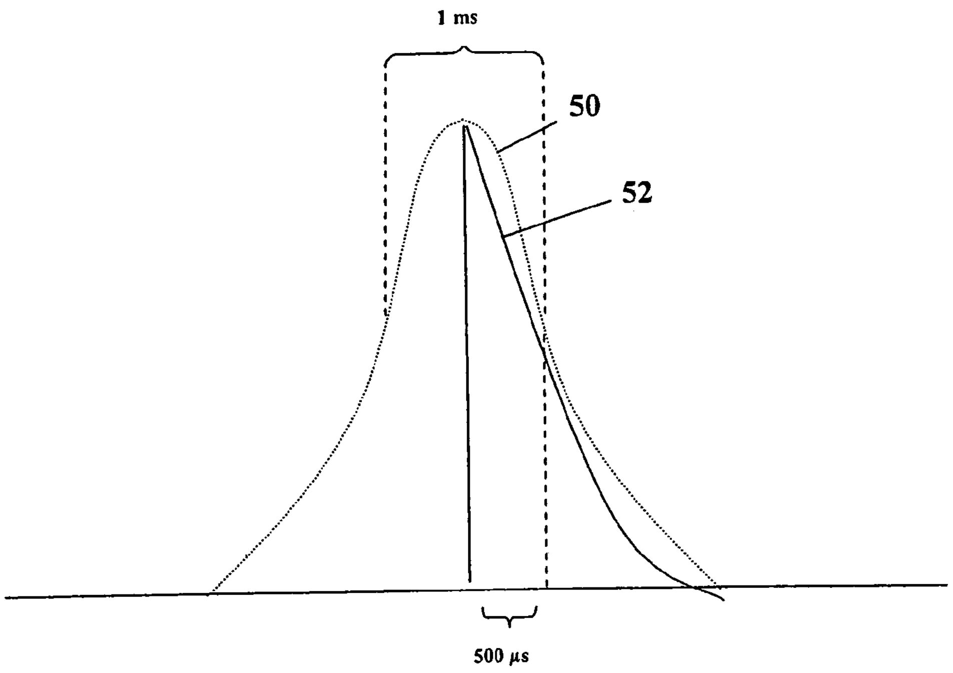
FIG. 4*a* shows a timing relationship between power supplies according to an embodiment of the present invention.
Figure 4B:
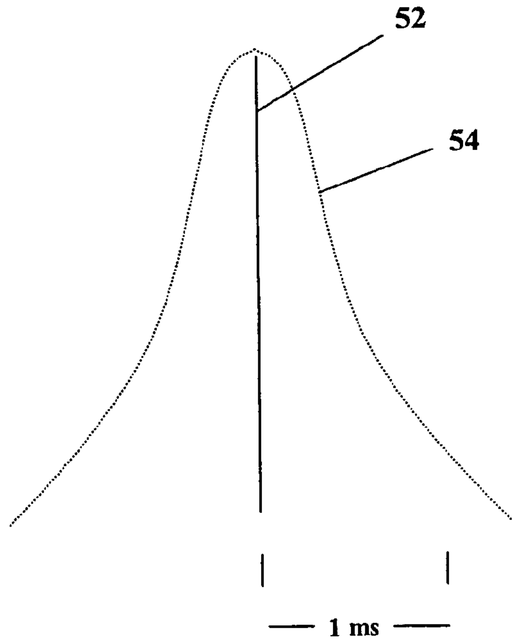
FIG. 4*b* shows a timing relationship between power supplies according to another embodiment of the present invention.

FIG. 4*a* shows a timing relationship between the output 50 of the deflection field power supply 20 and the output 52 of the initiator supply 18. According to an embodiment of the present invention, a trigger pulse maintains a plasma conduit between the first electrode 12 and the second electrode 14 until the current power supply 16 fully discharges into the circuit that includes the second electrode 14 and the air or other gaseous gap between the first electrode 12 and the second electrode 14. As can be seen in FIG. 4*a*, according to an embodiment of the present invention, the peak output 52 of the initiator supply 18 occurs within about a one millisecond window of the peak output 50 (corresponding to full width-half maximum (FWHM) of the peak output 50) of the deflection field power supply 20. Similarly, in FIG. 4*b*, the peak output 52 of the initiator supply 18 occurs within about a one millisecond window of the peak output 54 of the current power supply 16. By sequencing the initiator supply 18, the current power supply 16 and the deflection field power supply 20 with the proper timing, population inversion and ionic saturation of the plasma 28 coincides with saturation of the magnetic field and the alignment of the flux generated by the deflection field power supply 20 and the ring magnet 42.

Referring back to FIG. 1, the voltage power supply 26 may be used to charge the initiator supply 18. For example, the voltage power supply 26 may be a 9000 volt power supply. In applications where the peak voltage output of the initiator supply 18 is such that generation of the requisite voltage at the second electrode 14 with the proper timing and sufficient efficiency is difficult with a single supply, the voltage power supply 26 may be used to "pre-charge" the initiator supply 18. According to an embodiment of the present invention, the initiator supply 18 may include a bank of one hundred 450V capacitors, such as electrolytic capacitors, for example, organized as five banks of twenty capacitors. The voltage power supply 26 may charge each bank to 9000V for a total of 45 kV which can then be discharged in series using high speed switches or the like when triggered by the sequencer 24.

Thus, according to an embodiment of the present invention, the initiator supply 18 may supply high voltage, low current power to the second electrode 14 while the current power supply 16 may supply low voltage, high current power to the second electrode 14. The low voltage, high current power supplied by the current power supply 16 may be triggered by the initiator supply 18, which itself may be charged by the voltage power supply 28. When the initiator supply 18 generates a trigger pulse, a plasma may be formed between the first electrode 12 and the second electrode 14, creating a low resistance discharge path for the current power supply 16.

Figure 5:
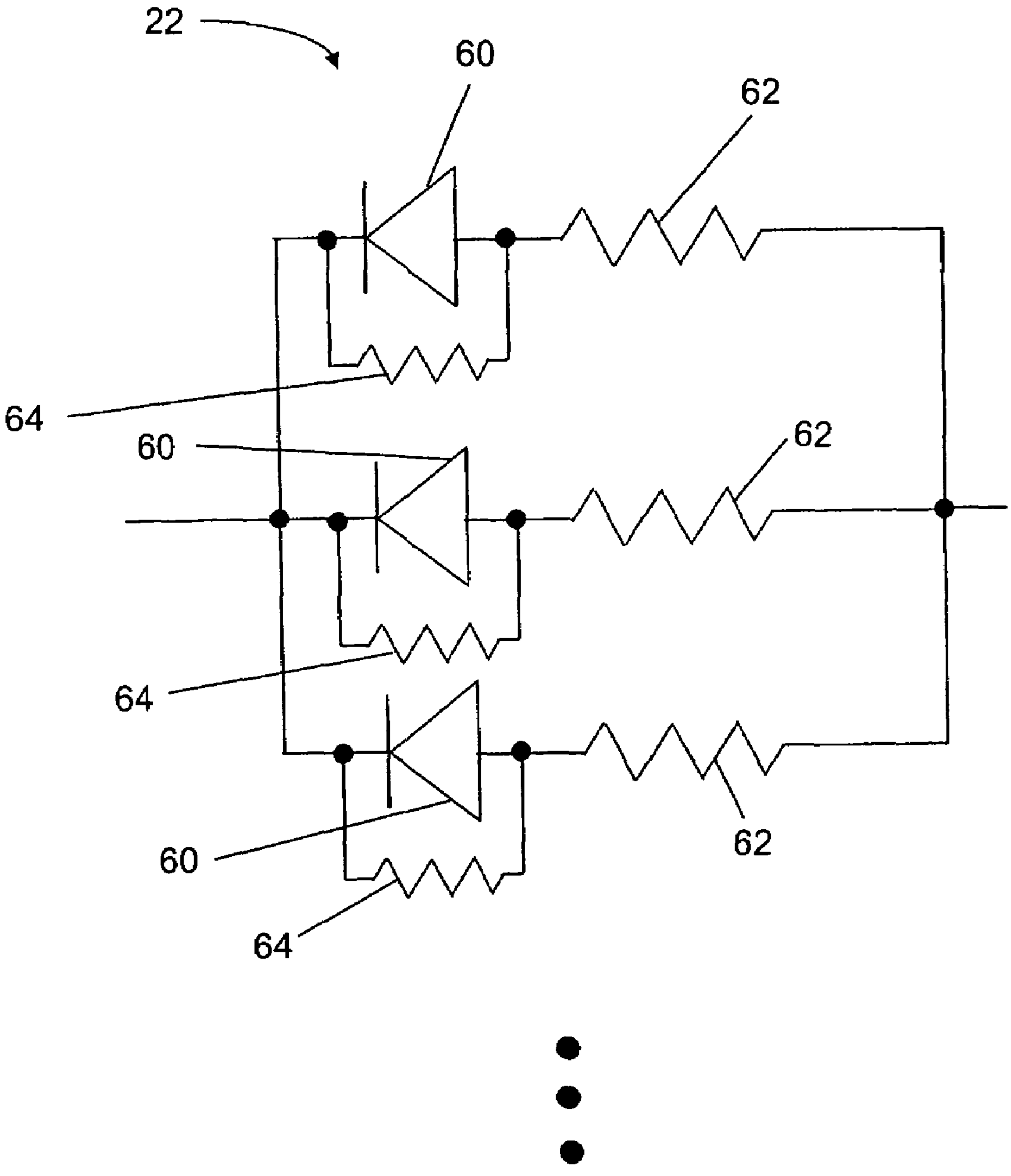
FIG. 5 shows an impedance matching network according to an embodiment of the present invention.

FIG. 5 shows a schematic diagram of the impedance matching network 22 according to an embodiment of the present invention. An impedance matching network may be desirable in order to maximize the transfer of power from the current power supply 16 to the circuit made up of the second electrode 14 and the gap between the first electrode 12 and the second electrode 14, thus facilitating the coincidence of population inversion and ionic saturation of the plasma 28 with saturation of the magnetic field and the alignment of the flux generated by the deflection field power supply 20 and the ring magnet 42. The impedance matching network 22 may include a parallel connection of diode 60-resistor 64 and resistor 62 elements.

According to an embodiment of the present invention, nine sections of the diode 60-resistor 64 and resistor 62 network may be connected in parallel. The impedance matching network 22 may facilitate an efficient discharge of current from the current power supply 16 to a circuit made up of the second electrode 14 and the gap between the first electrode 12 and the second electrode 14. The diodes 60 may be chosen for high reverse voltage characteristics. For example, according to an embodiment of the present invention, the diodes 60 may be high voltage diodes capable of withstanding reverse voltages up to or exceeding 45 KV and also capable of withstanding surge currents of up to 200 amps and more for periods of more than 8 milliseconds. Similarly, the resistors 62 may be chosen for high power handling capabilities and matching of the impedance of the second electrode and the air gap or other gaseous gap between the first electrode 12 and the second electrode 14. Also, according to an embodiment of the present invention, the resistors 62 may have a value of 0.005 ohms. Also, according to an embodiment of the present invention, the resistors 64 may have a value of 44 Mohms. Additional impedance matching elements may be connected in series or in parallel with the diode 60-resistor 64 and resistor 62 network and chosen to match the impedance of the second electrode and the air gap or other gaseous gap between the first electrode 12 and the second electrode 14 making up the path for the flow of plasma 28 current.

Figure 6:
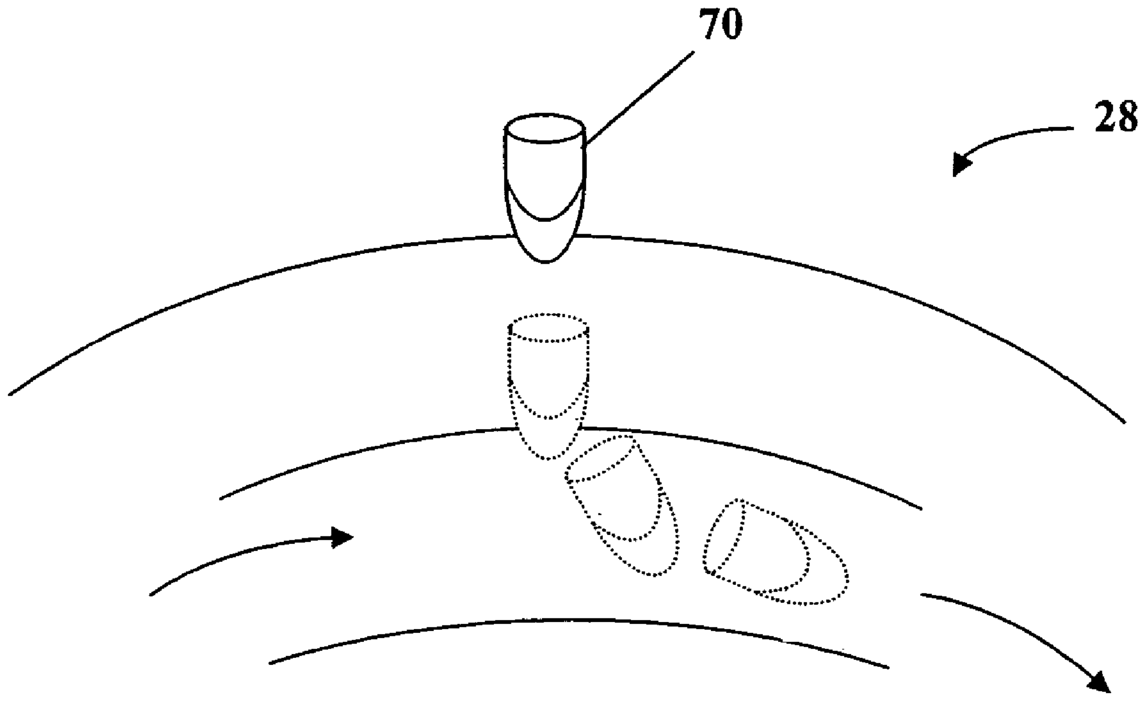
FIG. 6 shows a particle or projectile deflection using a plasma according to embodiments of the present invention.

FIG. 6 shows a particle deflection using the plasma 28 generated by embodiments of the present invention. In FIG. 6, a particle 70 is acted upon by the plasma 28. Using embodiments of the present invention, by operating the current power supply 16, the initiator supply 18 and the deflection field supply 20 in such a way that the energy of the plasma 28 as it rotates about the circumference of the first electrode 12 is greater than the energy of the particle 70 as the particle 70 enters the plasma, the force of the plasma 28 changes the direction of the particle 70 when the particle 70 meets the plasma 28 so that the particle 70 moves in a direction parallel to the field of plasma 28 rotation. Thus, the particle 70 assumes a rotational velocity and is effectively precluded from reaching the center of the plasma 28. By properly adjusting the energy of the plasma 28 to the energy of the particle 70, the particle 70 may be deflected from its original path and may leave the plasma 28 at a velocity slower than its original velocity and in a direction away from its original direction. Thus, anything existing at the center of the plasma 28 may be effectively shielded by the plasma 28.

Figure 7:
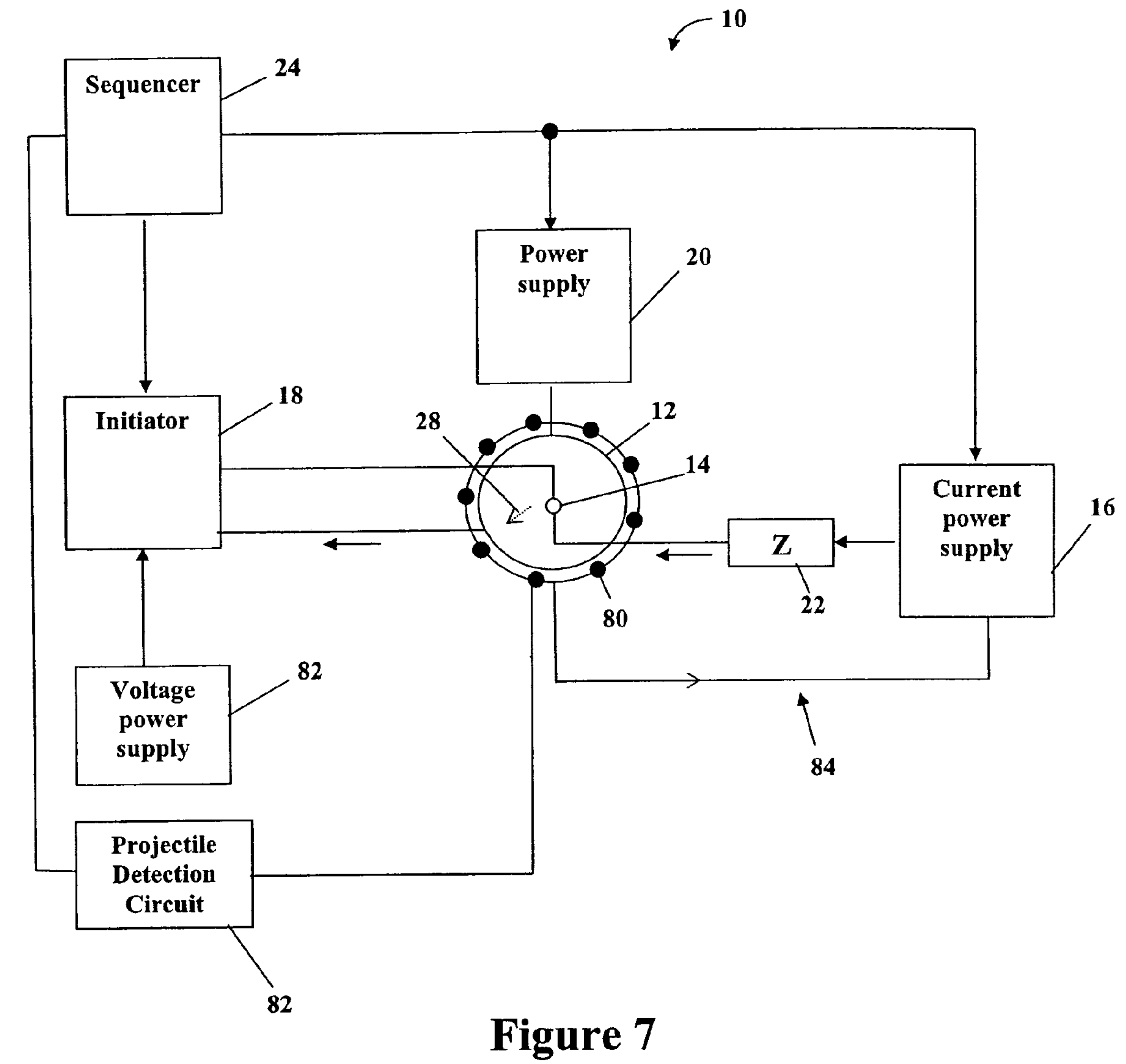
FIG. 7 shows a system for plasma generation according to another embodiment of the present invention.

FIG. 7 shows a system for plasma generation 10 according to another embodiment of the present invention. The system 10 shown in FIG. 7 is similar to that shown in FIG. 1 except that the system 10 shown in FIG. 7 includes a sensor 80 and a projectile detection circuit 82. The sensor 80 and the projectile detection circuit 82 may be used to detect particles before they enter a boundary of the plasma 28 field and trigger a sequence of events that generates a plasma 28 field in sufficient time to deflect a projectile or other particle.

The sensor 80 may be any of a variety of individual sensors or sensor arrays with projectile or particle detection capabilities. For example, according to an embodiment of the present invention, the sensor 80 may be an optical reflective obstacle detection system using fiber optics and infrared sensors. Information relating to a projectile that has upset the optics of the sensor 80 may be fed to the projectile detection circuit 82. Information from the projectile detection circuit 82 may, in turn, be fed to the sequencer 24 to synchronize generation of the plasma 28 field so that incoming projectiles or particles are deflected.

The system 10 shown in FIG. 7 may also include a feedback path 84 from the vicinity of the first electrode 12 to the current power supply 16. The feedback path 84 may be used to sense the quality of the air (such as the number and/or type of particulates in the air, for example) around the first electrode 12 so that the impedance matching network 22 may be adjusted to an optimal impedance for current discharge.

Figure 8:
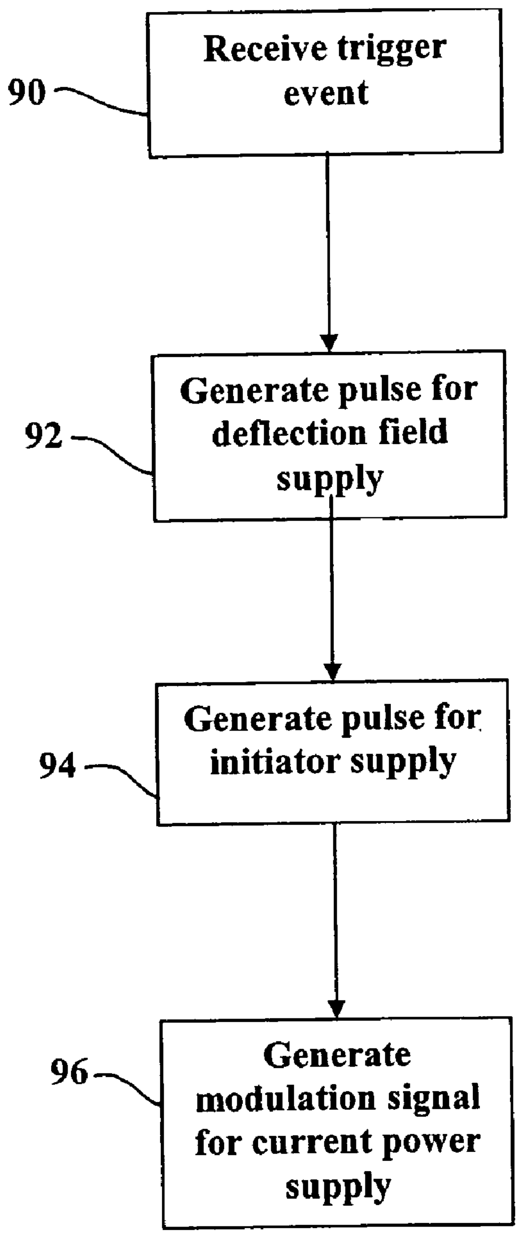
FIG. 8 shows a method for initiating a plasma and plasma field according to an embodiment of the present invention.

FIG. 8 shows a method for initiating a plasma 28 and plasma 28 field according to an embodiment of the present invention. At step 90, a trigger event is received. According to an embodiment of the present invention, the trigger event may be the detection of a projectile by the sensor 80. At step 92, a sequencing signal is generated for the deflection field power supply 20. The sequencing signal may be a pulse from the sequencer 24. Subsequent to generation of the sequencing signal for the deflection field power supply 20, a sequencing signal is generated for the initiator supply 18. As was the case for the deflection field power supply 20, the sequencing signal for the initiator supply 18 may be a pulse from the sequencer 24. As was explained in connection with FIG. 4*a* and FIG. 4*b*, the sequencing signals are generated such that peak outputs of the power supplies occur at substantially the same time. At step 96, a modulation signal may be generated for the current power supply 16.

Based on the above discussion, the present invention is seen to disclose a system and method for generating a wall or sheet of plasma that can effectively function as a defensive shield or "force field". Unlike previous methods of plasma confinement which require the plasma to be enclosed within a physical structure, the present invention is able to generate and confine plasma into a stabile, free-standing "wall" that can be projected out onto an area that is not enclosed by a physical structure and has a shape that may be shaped as desired. Consequently, it is believed the present invention is able to produce a plasma-based defensive shield that can be projected around the perimeter of an area so as to protect any objects or inhabitants within that area. When the defensive shield is in place, it is believed objects and projectiles such as high-speed projectiles (e.g. bullets) directed toward the protected area deflect off of the plasma wall forming the defensive shield.

As already disclosed, the underlying principle of the defensive shield is the generation and projection of plasma that is electromagnetically confined and shaped to form a free-standing wall or barrier. Plasma is typically considered the fourth state of matter, the other three being solids, liquids and gas. By definition, plasma is a distinct state of matter containing a significant number of electrically charged particles that affect both the electrical properties and behavior of the matter.

Figure 9:
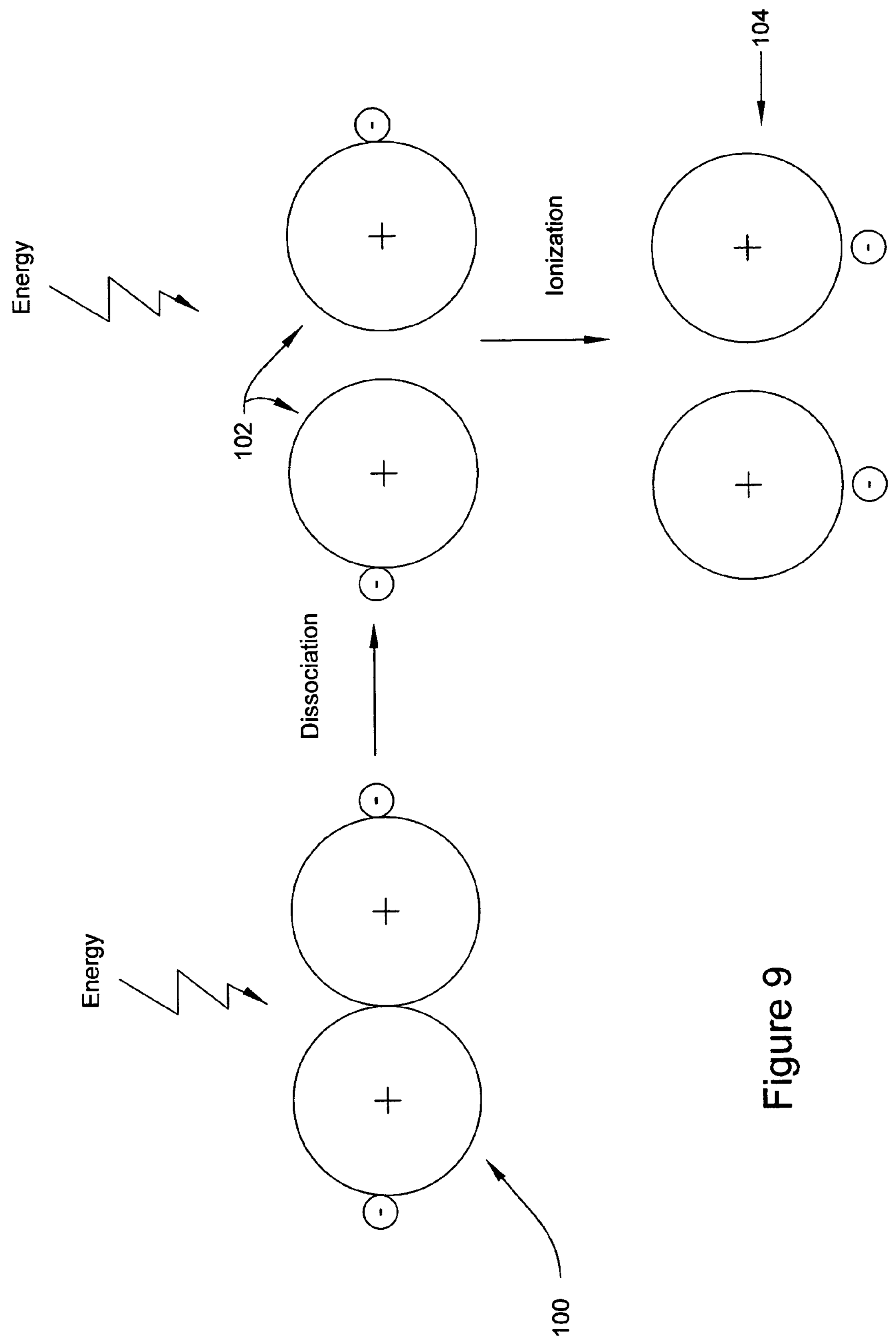
FIG. 9 shows the basic process involved in forming plasma.

A typical gas is comprised of molecules, which in turn are comprised of atoms containing positive charges in the nucleus which are surrounded by an equal number of negatively charged electrons. As a result of the equal number of positive and negative charges, each atom is electrically neutral. As illustrated in FIG. 9, a gas becomes plasma when the addition of energy, such as heat, first causes the gas molecules 100 to disassociate or break into atoms 102. Continued addition of energy subsequently ionizes the atoms, causing them to release some or all of their electrons. The remaining parts of the atoms are left with a positive charge, while the detached negative electrons are free to move about. When enough atoms are ionized to significantly affect the electrical characteristics of the gas, it becomes a plasma 104.

Due to its unique properties, plasma is frequently used in industrial applications (e.g. plasma torch for cutting and welding) as well as scientific research (e.g. the study of nuclear fusion). However, regardless of the application or setting, a key factor in the use of plasma is the ability to confine and control it.

The general concept of utilizing electromagnetic fields (EMF) to control and confine plasma is not new. For example, scientists researching the process of nuclear fusion frequently utilize a device known as a tokamak, which is a fusion reactor designed to generate high-energy plasma that can be heated to temperatures as high as one hundred million degrees Celsius. The extreme heat speeds up the nuclei of the plasma, thereby increasing the chance that two nuclei, both with positive charges that would normally repel one another, can collide and fuse.

Figure 10B:
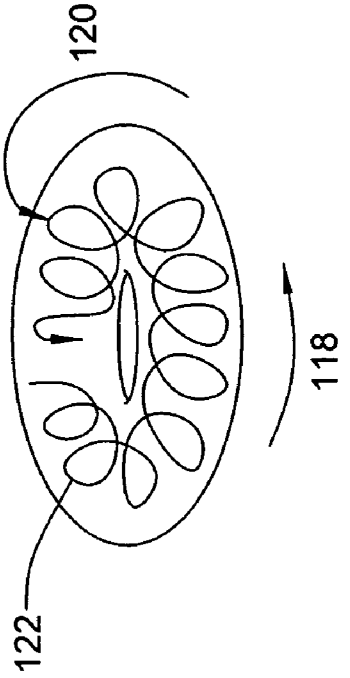
FIGS. 10*a* and 10*b* show, respectively, a prior art tokamak fusion reactor and the electromagnetic fields that the reactor generates.
Figure 10A:
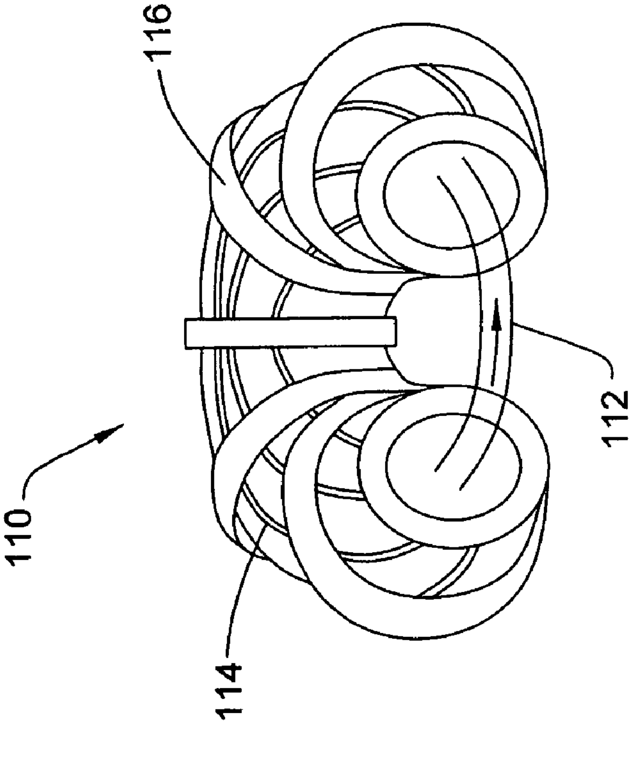

As illustrated in FIG. 10A, the tokamak 110 is a donut-shaped structure (torus) designed to contain high energy plasma 112 that circulates within the interior of the tokamak. Due to its extremely high temperature, the plasma 112 circulating within the tokamak must be prevented from coming into contact with the walls of the structure. This is accomplished by electromagnetically confining the plasma to the center of the interior of the structure. This electromagnetic confinement is achieved by the use of multiple electromagnets that encompass or surround the donut-shaped structure. Specifically, a first set of electromagnets 114 are mounted upon and run around the torus in the long direction (known as the toroidal direction), while a plurality of electromagnets 116 are evenly spaced upon and run around the torus in the short direction (known as the poloidal direction). As illustrated in FIG. 10B, the resultant toroidal magnetic field 118 generated by electromagnets 116 combines with the poloidal magnetic field 120 generated by electromagnets 114 to form a helical magnetic field 122 that spirals around the torus and "traps" the plasma within the center of the interior.

As illustrated in FIG. 10A, typical prior art devices such as the tokamak 110 do not generate free-standing plasma fields. Instead, these devices are designed to generate plasma within the confines of a sealed container. Furthermore, in order for the tokamak 110 and similar prior art devices to achieve electromagnetic confinement of the plasma within the central interior of the container and away from the walls of the device, they require a plurality of electromagnets configured to encompass or surround the entire device.

As previously discussed, unlike prior devices and methods for confining plasma, the present invention does not generate and confine plasma within a sealed container. Instead, the present application discloses a device and method for electromagnetically confining plasma in such a manner as to form a free-standing plasma wall or barrier that can be projected over an area in order to function, for example, as a defensive shield. Furthermore, unlike the prior art, the disclosed method and corresponding device do not require multiple electromagnets positioned in such a manner as to envelop or surround all sides of the area to which the plasma is to be confined. Instead, as discussed above, and as will be further elaborated on below, the inventive method and device is capable of operating with a single electromagnet, for example, positioned to one side of the area to which the plasma is to be confined.

Figure 11:
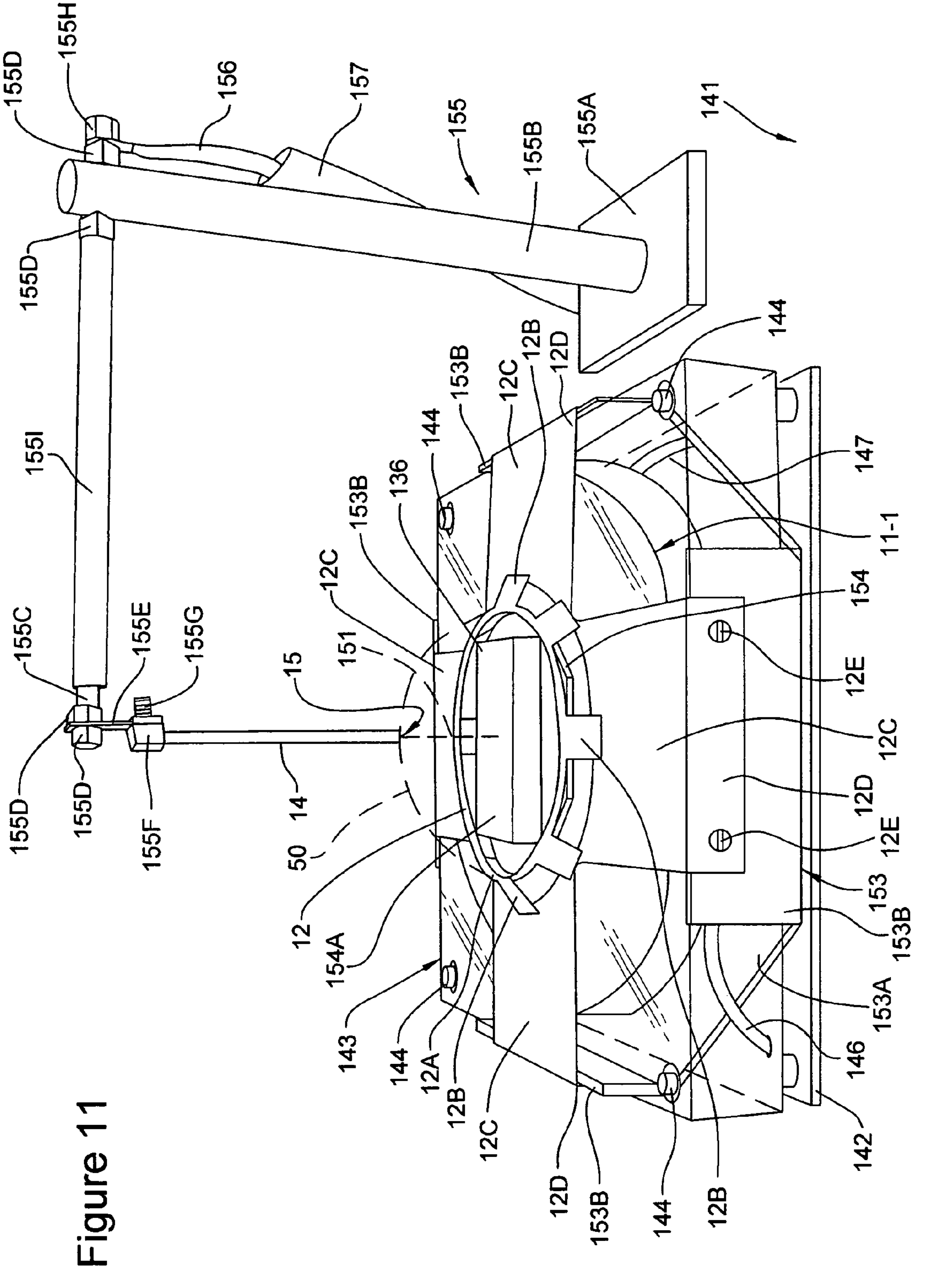
FIG. 11 shows a system for projecting and electromagnetically confining a stabile, thin, free-standing wall of plasma in a cone or rod-shaped form that can effectively function as a defensive shield.

FIG. 11 illustrates one exemplary embodiment of a system 140 for plasma generation that is capable of projecting a plasma-based defensive shield 150 around an object or area. For reference sake, the same item numbers used for the system 10 illustrated in FIG. 1 will also be used for the system 140 illustrated in FIG. 11 whenever possible.

More particularly as to the system 140, this system 140 is configured for positioning on a base 141. This base 141 for test purposes would be a table but in application, could be a static structure such as a building or a mobile structure such as a vehicle, airplane or the like. The system includes a bottom support plate 142 formed of an insulative plexiglass. This bottom support plate 142 includes an insulative housing or container 143 positioned on the top thereof which preferably comprises top, bottom and side walls that are formed of sheets of plexiglass bolted together at the corners through connectors 144. Preferably this housing 143 defines an enclosed, hollow box although other suitable shapes are possible depending upon the ultimate geometric shape of the plasma field 150 being generated and the components therefor.

Figure 12:
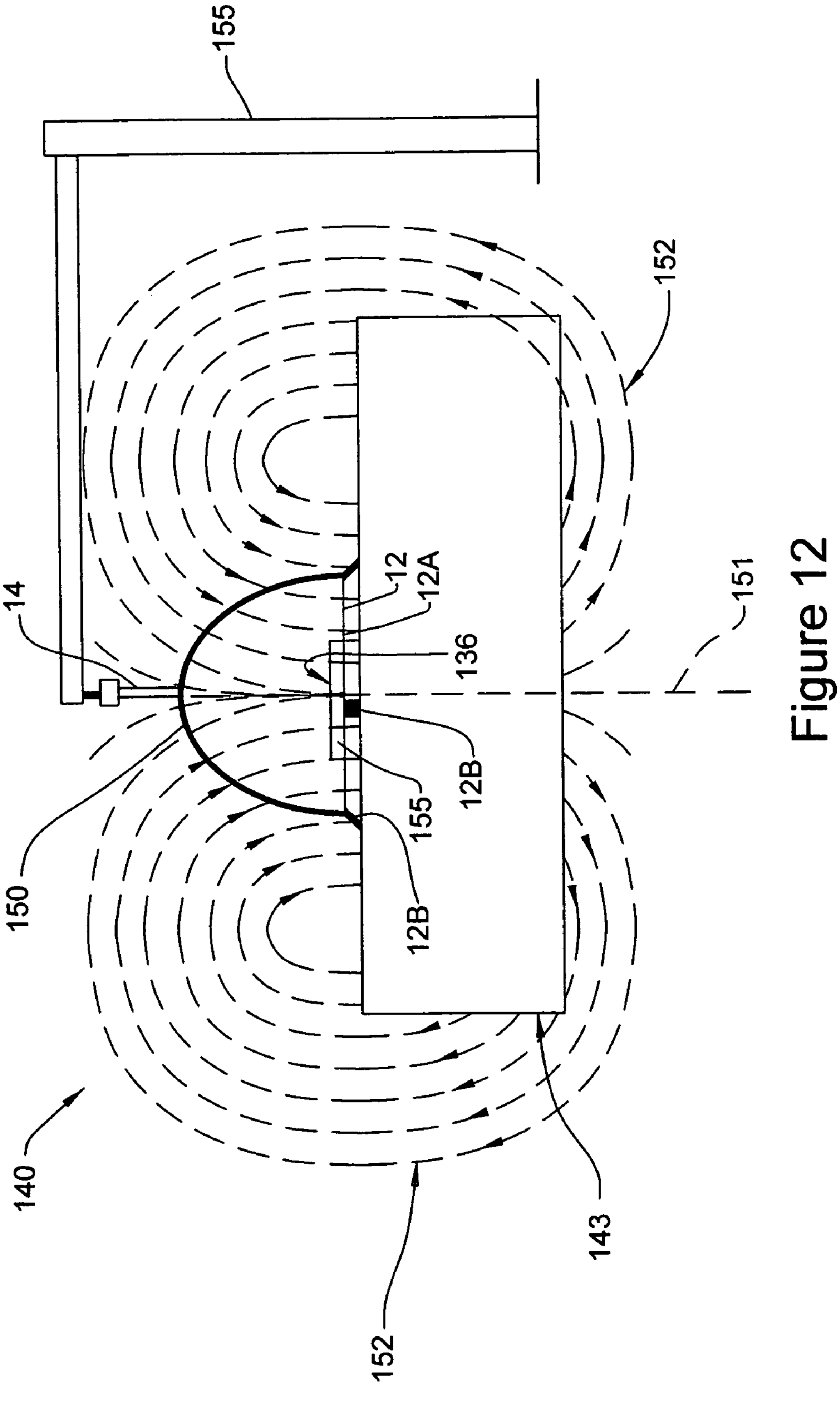
FIG. 12 shows the interaction of the particle/plasma beam with the electromagnetic field generated by the EMF generator.

The housing 143 includes an annular EMF generator 11-1 which comprises a solid core and a plurality of windings 34-1 wound about the core. These windings 34-1 are energized by the deflection field power supply 20 through cables 146 and 147 that are electrically connected to the power supply 20 and energize the windings 34-1 to produce the desired electromagnetic field. The field generator 11-1 thereby defines an electromagnet having a central vertical axis 151 as seen in FIG. 11. When energized, the field generator 34-1 defines an electromagnetic field 152 which will be described in further detail hereinafter relative to FIG. 12.

The system 140 further includes a field generator plate 153 that is formed of steel and includes a bottom plate 153A as well as four upstanding side walls 153B. The bottom plate 153A is disposed vertically between the upper surface of the bottom plate 142 as well as the opposing bottom surface of the housing 143 while the side plates 153B project vertically upwardly and exteriorly of the side faces of this housing 143 such that the housing 143 nests within the plate 153. This field generator plate 153 cooperates with and affects the electromagnetic field 152 generated by the field generator 11-1 to thereby assist in defining the shape and characteristics of this electromagnetic field as will be discussed in further detail hereinafter.

The system 10 further includes the electrodes 12 and 14. More particularly, the first electrode 12 in the illustrated embodiment is defined by an annular ring 12A of conductive wire or rod material, preferably formed of copper. This electrode ring 12A is disposed in a vertically raised position by upstanding support flanges 12B also formed of conductive copper. These flanges 12B project downwardly and outwardly and are affixed to horizontal electrode plates 12C which overly the top surface of the housing 143 and terminate at downwardly projecting connector flanges 12D. These connector flanges 12D are fastened to the upstanding side plates 153 by suitable fasteners 12E. It is noted that all of these components of the first electrode 12, namely components 12A-12E are all fixedly joined together and electrically connected together and furthermore are electrically coupled to the field generator plate 153 by their abutting surfaces. This plate 153 is furthermore connected to the negative terminal of the second electrode 12 by an electrical cable attached to this plate 153. As such, the plate 153 not only affects the magnetic field but also is part of the electrical circuit to which the first electrode 12 is connected.

As to the electrode ring 12A, this ring 12A encircles or bounds a center region in which is disposed an insulative support stand 154 on which an object 154 may be positioned. This object 154A is diagrammatically represented as a rectangular box but may represent any object or article being protected by the plasma field 150. For example, this object 154A may be any one of various objects such as flammable or electrical objects or other physical structures which may be disposed in this position without being affected or destroyed by the surrounding plasma field 150. Furthermore, while the stand 154 is offset downwardly or sidewardly relative to the electrode ring 12A, the stand 154 also may be raised so as to lie coplanar with the ring 12A.

As to the second electrode 14, this electrode 14 is suspended above the stand 154 by a support assembly 155. This support assembly 155 includes a base plate 155A which physically supports an insulative support boom 155B that projects upwardly and is spaced sidewardly of the housing 143. On the upper end of the boom 155B, an electrically conductive support arm or rod 155C is affixed in cantilevered relation so as to project sidewardly outwardly over and above the first electrode 12. This support arm 155C is connected to the support boom 155B by suitable fasteners 155D. The outer distal or free end of the support rod 155C includes additional clamping nuts 155D by which an electrically conductive hanger plate 155E is suspended. This hanger plate 155E includes a support collar 155F on the bottom end thereof in which the rod-like electrode 14 is received and then affixed thereto by a set screw 155G. Therefore, the second electrode 14 is electrically connected to the support arm 155C.

This support arm 155C further has an inner proximal end that has an electrical supply cable 156 connected thereto by an additional fastener 155H. An insulator tube 155I surrounds the arm 155C between the proximal and distal ends. The cable 156 extends downwardly into an insulative tube 157 and thereby is connected to the initiator supply 18 and current power supply 16 in accord with the diagram of FIG. 1. As such, this electrode 14 is suspended concentrically above the first electrode 12 in vertically spaced relation.

Before turning to the operation of the system 140, it will be understood that the relative vertical positions of the first and second electrodes 12 and 14 define the overall height of the plasma field 150 and that these relative vertical positions may be adjusted or varied to vary the overall height of the field 150. It has been shown that the electrode 14 may also be placed generally downwardly in the plane of the electrode ring 12A to define a plasma field 150 that has the shape of a flat circular disk rather than the dome shaped plasma field 150 described in further detail hereinafter.

Furthermore, the overall diameter of the electrode ring 12A may also be varied inwardly or outwardly to further vary the dimension of the plasma field 150. By shaping the electrode ring 12A and varying the relative positions of the electrodes 12 and 14, the plasma field 150 may be varied in its size, shape and overall characteristics.

Furthermore, the plasma field 150 as discussed in further detail hereinafter is governed by the electromagnetic magnetic field 152 in which it is generated such that the overall construction of the EMF field generator 11-1 may also be varied to vary the characteristics of the plasma field 150. In the illustrated embodiment of FIG. 11, this EMF field is affected by the positioning of the side plates 153A as well as the overall field characteristics generated by the specific EMF field generator 11-1 including the physical structure of the windings 34-1. The physical structure of the EMF field generator 11-1 furthermore may be varied to generate alternative magnetic field characteristics which thereby vary the characteristics and shape of the plasma field 150.

With the foregoing arrangement, the electrodes 12 and 14 thereby are electrically operated in accord with the circuit diagram of FIG. 1 and the disclosure provided above.

Upon activation of the system 140, a relatively large voltage difference between suspended electrode 14 and circular electrode 12 is initially established in order to initiate a breakdown of the air gap between the two electrodes, thereby initiating generation of plasma. For example, the circular electrode is grounded, while a 150 KV voltage is applied to the suspended electrode 14.

At roughly the same time that an initial voltage is applied to electrode 14, the EMF generator 11-1 contained within housing 128 is powered up. Consequently, EMF generator 11-1 begins to establish an electromagnetic field 152, which is graphically represented in FIG. 12 as magnetic field tenser lines. This electromagnetic field 152 and its characteristics are defined and shaped by the components of the EMF generator 11-1 described above relative to FIG. 11.

A particle beam begins to emit from the suspended electrode 14 due to the high voltage difference that initially exists between electrodes 12 and 14. In the current embodiment, the tip 15 of suspended electrode 14 is cut or shaped to be flat. As a result, the induced particle beam emits from the side of the electrode tip 15, thereby directing the beam more perpendicularly into the electromagnetic field 152 generated by EMF generator 11-1. If the tip 15 were pointed instead of flat, the particle beam would project more straight down instead of perpendicularly into the electromagnetic field 152.

The induced particle beam initiates the production of plasma by heating the air and causing the various gas molecules to dissociate and ionize. If no external electromagnetic field 152 was present, the particle/plasma beam would generally travel in a straight line from the tip 15 of suspended electrode 14 to a point on the circular electrode 12 located on the surface of housing 128. However, because of the presence of the electromagnetic field 152 generated by EMF generator 11-1, the particle/plasma beam bends as it travels downward and outward to the circular electrode 12. This curved displacement of the particle/plasma beam is explained by the Lorentz Force Law, which prescribes that a magnetic field exerts a force upon an electric charge, such as a charged or ionized particle, as that charge moves through the magnetic field. As a result of these Lorentz forces, such as forces 36 described previously relative to FIG. 2B, the particle/plasma beam curves as it travels, resulting in the path of the beam to be more circular.

Plasma begins to build-up as the air continues to heat, resulting in an increasing number of gas molecules to dissociate and then ionize to form free positively and negatively charged particles. Population inversion eventually occurs when the number of particles existing in an excited state (ionized state) exceeds the number of non-ionized particles occupying a lower energy state. The process continues until the plasma has reached a state of near-total population inversion and ionic saturation, with the number of ionized or charged particles greatly exceeding the number of non-charged particles (e.g., a ratio of eight charged particles to every non-charged particle).

As near-total population inversion occurs, the plasma beam traveling between the two electrodes 12 and 14 begins to spiral or rotate about the central axis of the EMF generator 11-1, which coincides with the center of the circular electrode 12 and the axis of the suspended electrode 14. This rotation of the plasma beam is again the result of Lorentz forces 36 created by the electromagnetic field 152 acting on the charged particles of the plasma beam. As a consequence of this rotation, the plasma beam generally forms a cone or domed-shaped field of plasma with the electrode 14 being on an initiator side of the plasma and the electrode 12 being on a receptor side.

Figure 13:
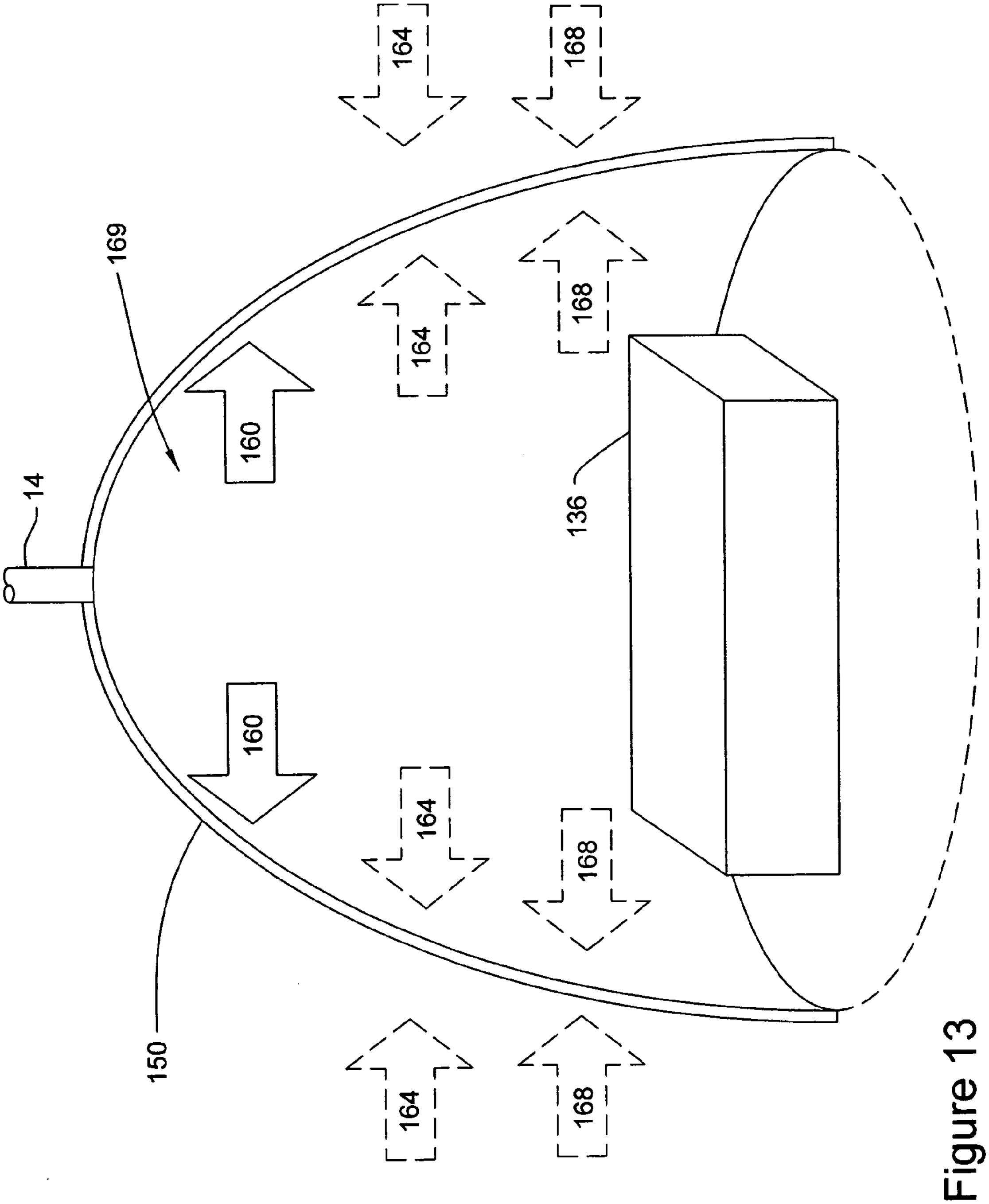
FIG. 13 shows the various forces that interact with and allow for the generation of a stabile, thin sheet of plasma around the perimeter of a defined area.

Various forces act upon and influence the movement of the generated plasma field. As a result of a balancing of these forces, the plasma field forms a cone or semi-spherical shaped sheet or wall of plasma 150 (FIG. 12) that rotates about the central axis 151 of the EMF generator 11-1. These various forces will be discussed with reference to FIG. 13, which depicts a cross-sectional view of a stabile, cone or dome-shaped wall of plasma.

Combined thermodynamic and centrifugal forces 160 acting upon the plasma try to push out and expand the plasma field 150. The thermodynamic forces are the intrinsic result of the heated plasma, and always act to try to expand the plasma field radially outwardly. As the plasma field 150 is rotating, it also is subject to centrifugal forces, which act to also try to expand the plasma field outwardly.

The electromagnetic field 152 generated by EMF generator 11-1 also creates forces 164 that act upon the plasma. Specifically, the electromagnetic field 152 creates Lorentz forces that act upon the charged plasma particles in a manner that both urge the plasma to expand outward as well as push the plasma in. From another perspective, the Lorentz forces can be seen as trying to position the plasma field along a specific curved plane that coincides with the strongest point of the electromagnetic field 152, thereby imparting greater spatial and dimensional stability to the plasma field.

In addition to forces caused by external magnetic fields, the plasma 150 is also subject to forces associated with an intrinsic electromagnetic field generated by the plasma itself. As described by Maxwell's Laws, magnetic forces arise due to the movement of an electrical charge. Specifically, an electric current flowing through the plasma results in the creation of an associated electromagnetic field. This electromagnetic field intrinsic to the plasma leads to the creation of additional Lorentz forces that act back upon the plasma. This phenomenon is generally referred to as the pinch effect, which prescribes that when an electric current is passed through a gaseous plasma, a magnetic field is set up that tends to force the current-carrying particles together. The resultant forces 168 of the pinch effect leads to the plasma to become compressed or contract in upon itself.

In the above example, a balancing of thermodynamic and centrifugal forces with the various Lorentz forces associated with the intrinsic and extrinsic electromagnetic fields results in a stabile, thin, cone or rod-shaped wall or sheet of plasma 150. Furthermore, the interior of the cone-shaped plasma field 150 not only remains unaffected, but becomes protected by the wall of plasma to thereby define an interior protection zone or space 169 disposed interiorly of or adjacent to the plasma field 150. The system 140 also could be configured with the protection zone being defined by the side of the plasma 150 nearest the electrode 14.

As previously noted, a sufficiently high enough voltage is initially applied to suspended electrode 14 by voltage initiator supply 18 in order to initiate the formation of plasma. A sufficient amount of current must also be initially provided to electrode 14 by current power supply 16 in order to assure that the plasma field 150 starts off with sufficiently high enough current levels that exceed a predetermined pinch effect threshold. This assures that the plasma field 150 will be subject to the pinch effect from the beginning of its formation, which is necessary for the creation of a wall of plasma around the area 169 while not affecting the interior of the area 169 or articles disposed in this region.

Once initiated, the plasma defense shield 150 can be kept in a steady state with a substantially lower level of voltage at electrode 14. Accordingly, voltage levels at electrode 14 only need to be high for initiation of the plasma defense shield. For example, initiation of a plasma field may require the application of 150 KV at electrode 14, but once the field is formed, it can be maintained with only 800 V at electrode 14.

As previously discussed, prior systems for electromagnetically confining plasma, such as the tokamak, are designed to work with extremely hot, high-energy plasmas. Furthermore, these previous systems are configured to encourage particle collisions, which results in the generation of even more energy/heat. In contrast, the present invention as described in the embodiment above produces a very efficient plasma field. Specifically, the present invention is able to reach population inversion and ionic saturation levels where current is flowing through the plasma, but the plasma particles are not colliding or interacting with each other. Instead, the plasma particles effectively move/rotate in unison. Compared to prior systems, the present invention creates a stabile plasma field that loses very little energy due to the generation of heat or radiation (i.e., light). Instead, a majority of the plasma energy gets turned into rotational forces. By energizing all the atoms to the same energy level and trapping them with a magnetic field to a very confined area, the plasma mass starts to behave like an armature of an electric motor, with a majority of the energy being applied to "turn the armature" or rotate the plasma.

Accordingly, the present invention is seen to disclose a system and method for confining plasma by electromagnetic fields. In addition, the disclosed system and method provides for the generation of an efficient and effective defensive shield or "force field", whereby a stable, thin sheet of plasma can be projected around the perimeter of an area much like a wall, while not adversely affecting anything within the interior of the area either physically or electrically. Furthermore, the rapid rotary motion of the plasma particles as well as the density of the field produces a pressure gradient that effectively functions like a solid wall of air through which an object cannot pass without deflection or damage.

According to one embodiment, a plasma defense shield could be continuously projected around an area needing protection. Alternatively, as previously mentioned, the system could incorporate some form of monitoring system capable of detecting incoming ballistic projectiles. Such a monitoring system may simply involve the constant projection of a very low power plasma field that would be unable to stop projectiles but could be efficiently maintained for long periods of time. As an incoming projectile begins to cross the plasma field, the impedance of the field would fluctuate. A monitoring circuit detects such changes in impedance and, while the projectile was still entering the field, increases the power level of the plasma field to the point where it would effectively function as a defensive barrier.

Figures 14A, 14B, 14C, 14D, 14E:
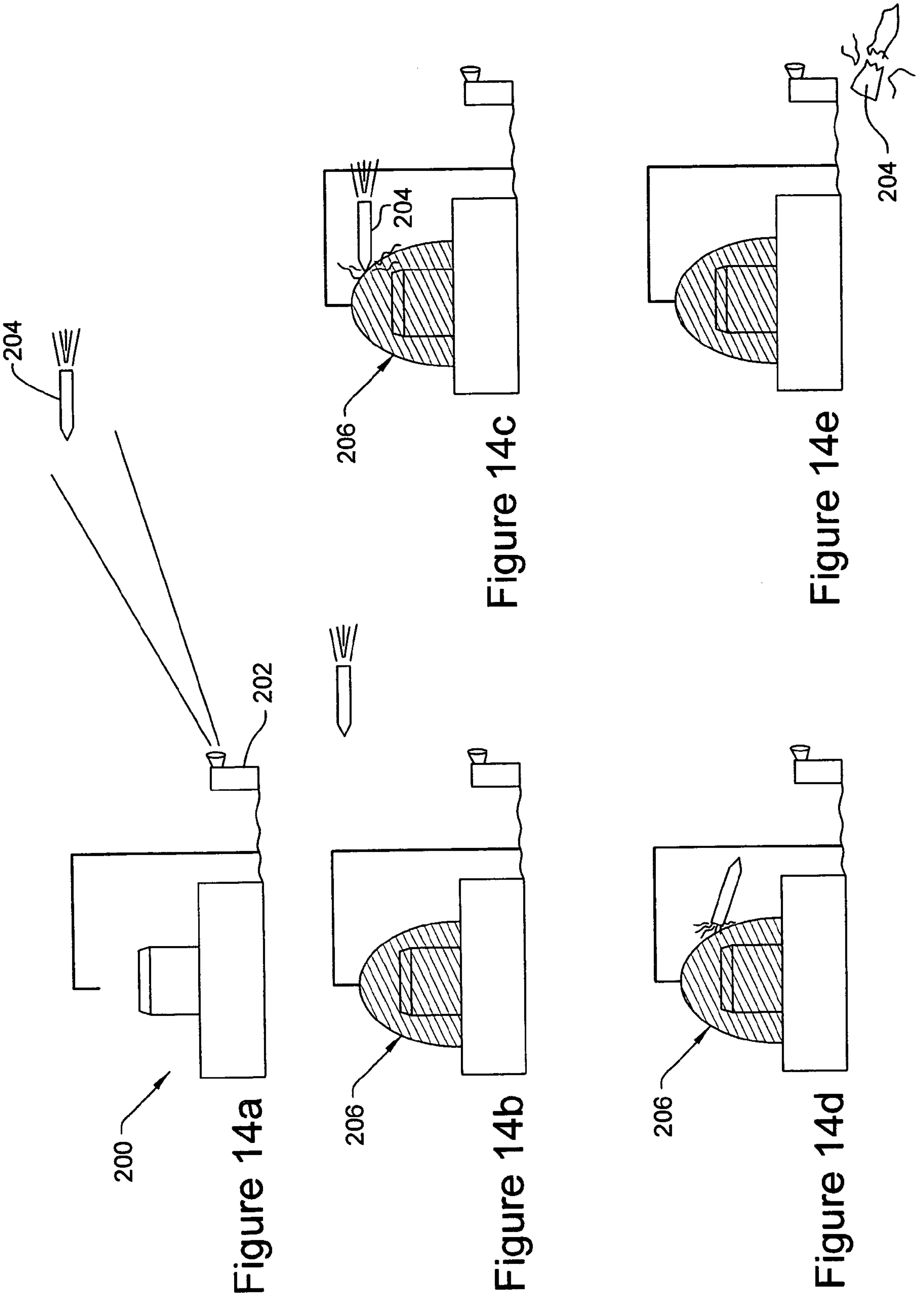
FIGS. 14*a*-14*e* show the operational steps of a plasma-based defensive shield system incorporating a system for remotely detecting incoming projectiles.

Alternatively, a plasma-based defensive shield system 200 as described above could be combined with a more elaborate military detection system 202 that is capable of detecting projectiles 204 by various remote monitoring means such as radar. As illustrated in FIG. 14A, such a system would typically keep the plasma-based defensive shield 206 inactive. However, as illustrated in FIG. 14B, upon detection of an incoming projectile 204, the system would activate the shield 206 for a brief period of time, maintaining it until the projectile has impacted the shield and is deflected and/or destroyed. See FIGS. 14C and 14D. Once the threat has passed, the system 200 would automatically deactivate the defensive shield 206. See FIG. 14E.

According to an alternative embodiment of the present invention, the circular or negative electrode 12 could be replaced by any grounded structure, including the earth 210 itself. Such a configuration, as illustrated in FIG. 15, would allow for a more effective and practical means of protecting non-stationary objects, such as a vehicle 212, with a plasma-based defensive shield.

Figure 15:
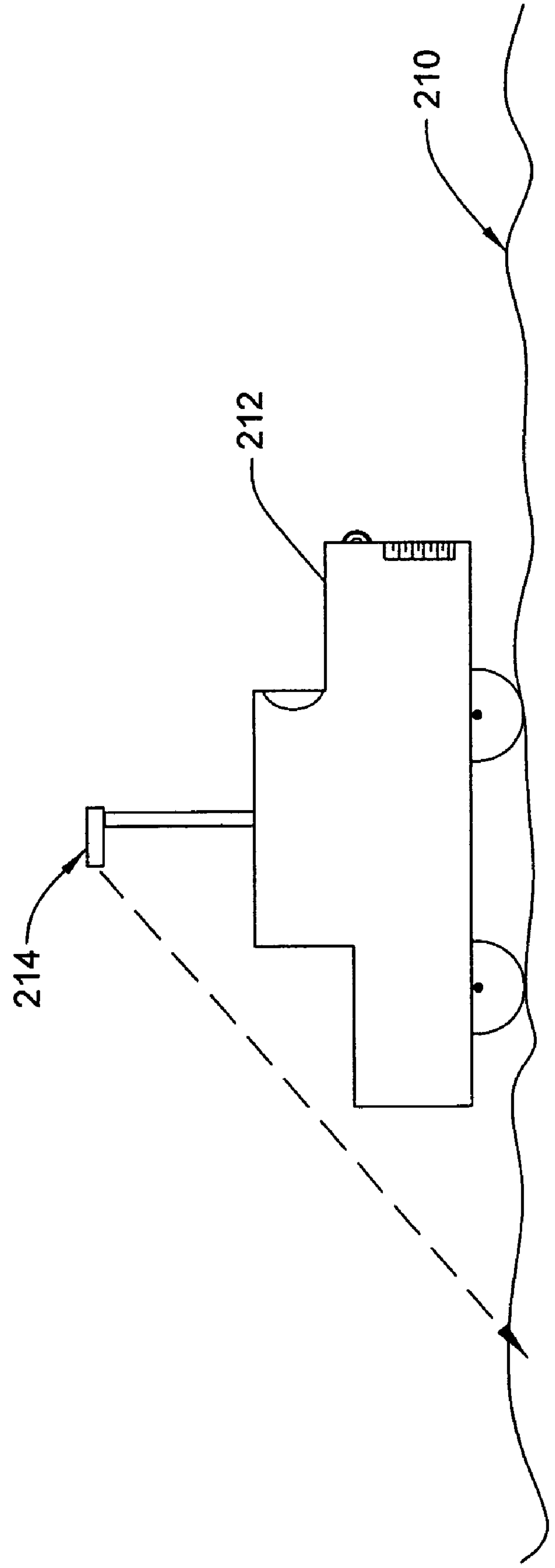
FIG. 15 shows an additional embodiment of a plasma-based defensive shield system that utilizes the ground as one of the electrodes.

According to another embodiment, an example of which is also illustrated in FIG. 15, the electrode 14 that is typically positioned above the object being protected could be replaced with a microwave laser or ultraviolet laser 214 or any other means for initiating a plasma field.

Figure 16:
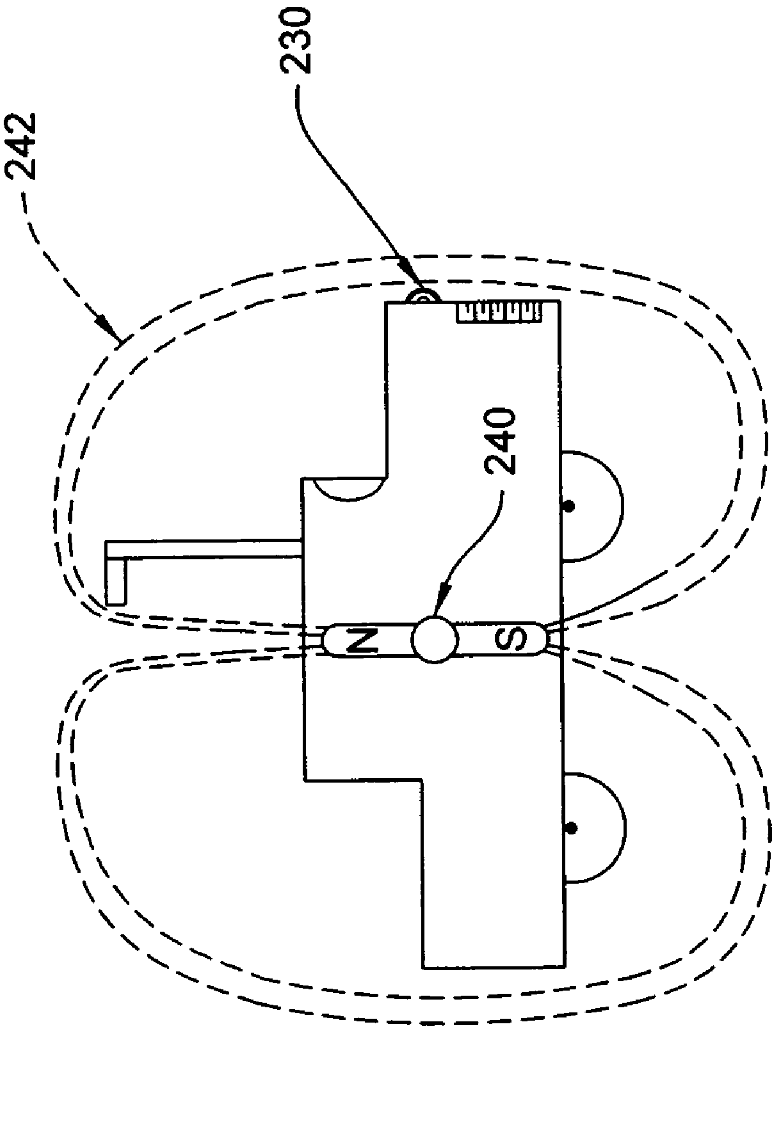
FIG. 16 shows an additional embodiment of a plasma-based defensive shield system that utilizes a rod-shaped EMF generator.

In the embodiments described above, a ring-shaped electromagnet was utilized as the EMF generator 11. In such embodiments, only the portion of the electromagnetic field projected above one pole of the magnet is effectively utilized to aid in the containment of the plasma field. However, according to a further embodiment, the ring-shaped electromagnet is replaced with a rod-shaped electromagnet that can be completely contained within the vehicle or object being protected. See the illustrative example of FIG. 16, which depicts a vehicle 230 incorporating a plasma-based defensive shield system. Contained within the vehicle is a rod-shaped electromagnet 240. When activated, the rod-shaped electromagnet generates an electromagnetic field 242 that projects out from both poles of the magnet 240 and could be used to confine and shape a plasma-based defensive shield around the entire vehicle 230.

It is also believed possible to project a plasma-based defensive shield around any shaped object in such a manner that the thin sheet of plasma making up the defensive shield closely follows the contours of the object. For instance, the object could be covered in a super conductor "skin" that allowed for the generation of an electromagnetic containment field immediately adjacent the object's surface.

The primary embodiment above discloses the generation of a defensive shield by establishing a stable, free-standing "wall" of plasma roughly shaped in the form of a cone or cylinder. Thus, according to a prior example, a ground-based vehicle such as a tank could be effectively protected by the generation of a conical-shaped plasma-based defensive shield. According to an alternative embodiment previously discussed, a more spherical-shaped defensive shield can be generated by a system utilizing a rod-shaped EMF generator. Such a spherical-shaped field may be more appropriate for the protection of flying craft such as an airplane as the defensive shield could completely envelop the plane. Beyond conical and spherical-shaped defensive shields, it is believed the present application can be configured to generate a defensive shield of numerous other sizes and shapes depending on the relative placement of the system components, i.e., electrodes, as well as the size and shape of the external electromagnetic field being utilized to shape and confine the plasma field.

Beyond three-dimensional shapes, the present invention is also capable of generating a two-dimensional defensive shield. Specifically, a stabile wall of plasma can be electromagnetically confined to form a flat or planar, disc-shaped defensive shield. Such a shaped plasma field can be achieved by the combined effects of an appropriately shaped external electromagnetic field with, for example, the placement of the two electrodes 12 and 14 within the same plane so that a particle/plasma beam either projects from side to side or radially outward. The resultant disc-shaped defensive shield could be projected across a defined opening or entrance to function as a barrier. Possible uses for a "flat" plasma-based barrier are numerous, and include, for example, a plasma-based "door" or "window" that could quickly be projected into place in order to secure a room or corridor from the passage of physical objects as well as atmospheric containment.

Unlike prior electromagnetic plasma confinement applications such as those found in fusion reactors, the present invention generates a relatively efficient plasma field in which little energy is lost in the form of heat or radiation. As a result of this efficiency, a plasma-based defensive shield in accordance with the present invention can be generated with relatively low power requirements. For example, operation of a small system capable of generating a six inch diameter plasma-based defensive field may require around 500 Watts and could be readily powered by a standard 120 Volt household outlet or other low voltage power source.

According to another exemplary embodiment, a plasma-based defensive shield system could be configured with some form of projectile detection system, as previously discussed, that is capable of momentarily activating the defensive shield at the appropriate time necessary for deflecting an incoming projectile. In such an arrangement, the defensive shield would typically be inactive, and as such, the system would require little energy. Upon detection of an incoming projectile, the system would only require a burst of energy to briefly project a plasma field capable of deflecting the projectile. In the above arrangement, the system could be powered by a relatively low voltage source by incorporating a Marx generator or other functionally equivalent component that is capable of briefly producing a high energy pulse but be charged by a lower voltage source.

In a further embodiment, a larger system could be configured to generate a 24 foot diameter defensive shield capable of protecting a land-based vehicle such as a tank. The estimated power requirements for this larger system could be a minimum of 10-15 Kilowatts to generate a stabile field, with the power requirements increasing depending on the mass and kinetic energy of the projectile being deflected. A defensive shield system such as that above could readily be accommodated by a modern-day tank, which typically incorporates generators capable of producing 40-50 Kilowatts.

Even significantly larger and more powerful plasma-based defensive shields should already be achievable with the current state of technology. As the present invention need only briefly project a stabile wall of plasma in order to protect an object or area from projectiles, the system would require a power source capable of generating pulses of high energy. Such requirements are already achievable with the advent of newer power sources used in applications such as high-end military railguns. Once such existing power source, for example, is the compensated pulsed alternator (compulsator), which can produce extremely high amounts of energy for brief periods of time (e.g. 500 Megawatt pulse of energy).

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. A method of creating a free-standing wall of plasma, comprising the steps of:

initiating the formation of plasma at a first location which said plasma is subject to a pinch effect from the beginning of the plasma's formation, and said plasma flows through a space between said first location and a second location that is spaced from said first location;

generating an electromagnetic field externally of said plasma that acts on said plasma during said formation of said plasma at said first location wherein said electromagnetic field has Lorentz forces associated therewith which effect rotation of said plasma through said space about an axis; and balancing of thermodynamic forces and centrifugal forces acting upon the plasma with Lorentz forces associated with said electromagnetic field acting upon the plasma and other Lorentz forces associated with the pinch effect so as to confine said plasma in such a manner so as to form a sheet-like structure extending between said first and second locations.

2. The method according to claim 1, wherein the plasma is confined in such a manner so as to form one of a generally dome-shaped sheet-like structure, a generally sphere-shaped sheet-like structure, and a planar sheet-like structure.

3. The method according to claim 1, further comprising the step of projecting the sheet-like structure of plasma around a perimeter of an area that is not enclosed by a physical structure.

4. The method according to claim 1, wherein the plasma is placed in a state of population inversion so as to cause the plasma to rotate about a central axis defined by the electromagnetic field acting upon the plasma.

5. The method according to claim 1, wherein said plasma is formed by a first electrode at said first location and said plasma terminates at a second electrode at said second location.

6. The method according to claim 5, wherein said electromagnetic field has field lines intersecting said plasma in a transverse orientation between said first and second locations to effect rotation of said plasma.

7. The method according to claim 1, further including the steps of initiating a plasma formation current at said first location to initiate formation of said plasma when supplying a field generation current in a field generator to form said electromagnetic field concurrently with initiation of said plasma formation.

8. The method according to claim 7, wherein a peak plasma-initiating voltage level for the plasma formation occurs substantially at the same time as the peak electromagnetic voltage level of the field generation current to effect initiation of said plasma and rotation of said plasma.

9. The method according to claim 1, wherein said electromagnetic field has field lines which intersect said plasma transverse to said flow of said plasma between said first and second locations and transversely intersect said sheet-like structure of said plasma in said space.

10. A method of creating a free-standing wall of plasma, comprising the steps of:

initiating the formation of plasma that is subject to a pinch effect from the beginning of the plasma's formation, the step of initiating the formation of plasma comprising the step of applying an amount of electrical current that is equivalent to or exceeds a predetermined electrical current threshold associated with a predetermined pinch effect threshold; and balancing of thermodynamic forces and centrifugal forces acting upon the plasma with Lorentz forces associated with an electromagnetic field acting upon the plasma and Lorentz forces associated with the pinch effect so as to confine said plasma in such a manner so as to form a sheet-like structure.

11. The method according to claim 10, wherein said method comprises the step of providing a plasma generation system comprising an elongate first electrode that is longitudinally elongate, and a second electrode spaced from the first electrode so as to facilitate a discharge of power and formation of plasma between the first electrode and second electrode, said electromagnetic field acting upon the plasma so as to confine said plasma into a plasma boundary extending between said first and second electrodes and longitudinally along a length of said first electrode.

12. The method according to claim 11, wherein said second electrode has an annular shape.

13. A method of creating a free-standing wall of plasma, comprising the steps of:

initiating the formation of plasma that is subject to a pinch effect from the beginning of the plasma's formation; and balancing of thermodynamic forces and centrifugal forces acting upon the plasma with Lorentz forces associated with an electromagnetic field acting upon the plasma and Lorentz forces associated with the pinch effect so as to confine said plasma in such a manner so as to form a sheet-like structure, said method further comprising the step of producing a pressure gradient with the plasma that is capable of preventing an object from penetrating the plasma by deflecting or damaging the object.

14. The method according to claim 13, wherein said method comprises the step of providing a plasma generation system comprising an elongate first electrode that is longitudinally elongate, and a second electrode spaced from the first electrode so as to facilitate a discharge of power and formation of plasma between the first electrode and second electrode, said electromagnetic field acting upon the plasma so as to confine said plasma into a plasma boundary extending between said first and second electrodes and longitudinally along a length of said first electrode.

15. A method of creating a free-standing wall of plasma, comprising the steps of:

initiating the formation of plasma that is subject to a pinch effect from the beginning of the plasma's formation; and balancing of thermodynamic forces and centrifugal forces acting upon the plasma with Lorentz forces associated with an electromagnetic field acting upon the plasma and Lorentz forces associated with the pinch effect so as to confine said plasma in such a manner so as to form a sheet-like structure, said method further comprising the steps of:

applying a first voltage level so as to initiate the formation of the plasma; and applying a second voltage level so as to maintain the plasma in a steady state, wherein the first voltage level is greater than the second voltage level.

16. The method according to claim 15, wherein said second voltage level generates said plasma with sufficient power to prevent penetration of a projectile through said plasma.

17. The method according to claim 15, wherein a third voltage level greater than said second voltage level is applied to provide said plasma with increased power to prevent penetration of a projectile through said plasma.

18. A method of creating a free-standing wall of plasma, comprising the steps of:

initiating the formation of plasma that is subject to a pinch effect from the beginning of the plasma's formation; and balancing of thermodynamic forces and centrifugal forces acting upon the plasma with Lorentz forces associated with an electromagnetic field acting upon the plasma and Lorentz forces associated with the pinch effect so as to confine said plasma in such a manner so as to form a sheet-like structure, said method further comprising the steps of:

maintaining the plasma in a steady-state at a first power level;

adjusting the power level of the plasma to a second power level in response to detecting a fluctuation in an impedance of the plasma, wherein the second power level is greater than the first power level.

19. A method of creating a free-standing wall of plasma, comprising the steps of:

initiating the formation of plasma that is subject to a pinch effect from the beginning of the plasma's formation; and balancing of thermodynamic forces and centrifugal forces acting upon the plasma with Lorentz forces associated with an electromagnetic field acting upon the plasma and Lorentz forces associated with the pinch effect so as to confine said plasma in such a manner so as to form a sheet-like structure, said method further comprising the steps of:

activating the sheet-like structure of plasma upon detecting an incoming projectile; and maintaining the sheet-like structure of plasma in an active state until the projectile has impacted the plasma and is deflected or destroyed.

20. A system for generating a free-standing sheet of plasma, comprising:

a first electrode that is generally annular in shape;

a second electrode positioned relative to the first electrode so as to facilitate a discharge of power and formation of plasma between the first electrode and second electrode;

an electromagnetic field generator configured to generate an electromagnet field that acts upon the plasma by generating Lorentz forces that causes the plasma to rotate;

at least a first power supply configured to provide power to the second electrode in such a manner so as to subject the plasma to a pinch effect from the beginning of the plasma's formation; and at least a second power supply configured to provide power to the electromagnetic field generator, wherein thermodynamic forces and centrifugal forces acting upon the plasma combine with a Lorentz force associated with the pinch effect and the Lorentz force associated with the electromagnetic field generator so as to form a free-standing sheet of plasma that is not enclosed by a physical structure.

21. The system according to claim 20, wherein the system is configured to generate the free-standing sheet of plasma that is not enclosed by a physical structure and which can be projected around a perimeter of an area.

22. The system according to claim 20, wherein the system is configured to generate a free-standing sheet of plasma that is not enclosed by a physical structure and which can be projected around an object so as to generally encompass the object in three-dimensions.

23. The system according to claim 20, wherein the system is configured to project a generally planar sheet of plasma.

24. The system according to claim 20, wherein the system is configured to produce a free-standing sheet of plasma that is capable of preventing an object from penetrating the plasma by deflecting or damaging the object.

25. The system according to claim 24, further comprising a monitoring system configured to detect the presence of a projectile by one of detecting a change in an impedance of the plasma field and by detecting a projectile by remote monitoring means.

26. The system according to claim 20, wherein the first electrode comprises a grounded structure.

27. The system according to claim 20, wherein the second electrode comprises one of a microwave laser and an ultraviolet laser.

28. The system according to claim 20, wherein the electromagnetic field generator comprises one of an annular electromagnet and a rod-shaped electromagnet.

29. The system according to claim 20, wherein the first power supply and second power supply are configured to coordinate the providing of power to the second electrode and electromagnetic field generator so that a placement of the plasma into a population inversion state generally coincides with saturation of the electromagnetic field.

30. A method of generating a wall of plasma in an open-space comprising the steps of:

providing a plasma generation system having first and second electrical conductors spaced apart from each other so as to be separated by a gap, and having an electromagnetic field generator capable of generating an electromagnetic field acting on said first conductor and through said gap;

supplying an electrical plasma generation current to said first conductor at a plasma generation level which initiates formation of plasma at said first conductor subject to a pinch effect wherein said plasma flows through said gap in a first direction from said first conductor to said second conductor;

supplying an electrical field generation current to said field generator, and generating said electromagnetic field externally of said plasma as said plasma flows through said gap, said generating step including the step of generating said magnetic field so as to act on said plasma at said first conductor during said initiation of said plasma formation and effect movement of said plasma through said gap in a second direction transverse to said first direction; and controlling the supply of said plasma generation current and said field generation current such that Lorentz forces of said electromagnetic field act on ionized particles of said plasma within said gap to effect said movement of said plasma through said gap and confine said plasma into a sheet-like plasma boundary formed within the electromagnetic field and extending between said first and second conductors, wherein said controlling step includes the steps of simultaneously supplying peak current levels for said plasma generation current and said field generation current to effect population inversion of said ionized particles during plasma formation while said plasma is subject to said pinch effect and effect accelerating movement of said ionized particles in said second direction.

31. The method according to claim 30, wherein said first electrical conductor is a first electrode defining a rotation axis, said second direction extending along a circumferential path extending about said rotation axis, and said method includes the step of moving said plasma circumferentially about said rotation axis.

32. The method according to claim 31, wherein said controlling step includes the steps of simultaneously supplying peak current levels for said plasma generation current and said field generation current to effect population inversion of said ionized particles during plasma formation while said plasma is subject to said pinch effect and effect accelerating movement of said ionized particles in said second direction.

33. The method according to claim 30, wherein said second conductor is ring-shaped and surrounds a central axis, and said first conductor is disposed proximate said central axis such that the method includes the step of rotating said plasma through said gap in said second direction about said central axis.

34. The method according to claim 33, wherein said first and second conductors are spaced apart in both said first direction and a third direction transverse to a surface of said plasma boundary wherein said plasma boundary has a dome shape extending from a peak defined at said first conductor to a base defined at said second conductor.

35. The system according to claim 31, wherein the power supply system is configured to coordinate the providing of power to the second electrode and electromagnetic field generator so that a placement of the plasma into a population inversion state generally coincides with saturation of the electromagnetic field.

36. The method according to claim 30, wherein said second conductor is longitudinally elongate in said second direction, and said electromagnetic field acts upon said plasma such that said sheet-like plasma boundary extends longitudinally along a length of said second conductor.

37. The method according to claim 30, wherein said electromagnetic field has field lines intersecting said plasma boundary in a transverse orientation between said first and second conductors to effect movement of said plasma along said second conductor.

38. The method according to Claim 30, wherein said plasma has sufficient power to prevent penetration of a projectile through said plasma.

39. The method according to claim 30, wherein said plasma generation system is operated in air wherein said plasma boundary extends through said air in said gap.

40. A plasma generation system for generating a sheet of plasma, comprising:

an elongate first electrode that is longitudinally elongate in shape;

a second electrode positioned relative to the first electrode so as to facilitate a discharge of power and formation of plasma between the first electrode and second electrode;

an electromagnetic field generator configured to generate an electromagnetic field that acts upon the plasma by generating Lorentz forces that cause the plasma to move along said second electrode and confine said plasma into a sheet-like plasma boundary extending between said first and second electrodes, said electromagnetic field transversely intersecting said sheet-like plasma boundary along said elongate first electrode such that said Lorentz forces are substantially parallel to said sheet-like plasma boundary along said first electrode; and a power supply system which supplies a first supply of power to the second electrode in such a manner so as to subject the plasma to a pinch effect from the beginning of the plasma's formation, and supplies a second supply of power to the electromagnetic field generator.

41. The system according to claim 40, said plasma boundary is formed in open space so as to not be enclosed by a physical structure and which can be projected around an object so as to generally encompass the object in three-dimensions and remain exposed to an environmental space.

42. The system according to claim 40, wherein the electromagnetic field generator comprises an annular electromagnet.

43. The system according to claim 40, wherein thermodynamic forces and centrifugal forces acting upon the plasma combine with a Lorentz force associated with the pinch effect and the Lorentz force associated with the electromagnetic field generator so as to form a free-standing sheet of plasma that is not enclosed by a physical structure.

* * * * *